US012640889B2

(12) United States Patent
Mangalvedhe et al.

(10) Patent No.: US 12,640,889 B2
(45) Date of Patent: May 26, 2026

(54) METHOD AND APPARATUS FOR INTERLEAVED CCE-TO-REG MAPPING WITHIN A PORTION OF A CONTROL RESOURCE SET

(71) Applicant: Nokia Technologies Oy, Espoo (FI)

(72) Inventors: Nitin Mangalvedhe, Naperville, IL (US); Louis Madier, Nozay (FR); Gilsoo Lee, Naperville, IL (US); Man Hung Ng, Swindon (GB); Rapeepat Ratasuk, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 354 days.

(21) Appl. No.: 18/365,807

(22) Filed: Aug. 4, 2023

(65) Prior Publication Data

US 2024/0113839 A1     Apr. 4, 2024

Related U.S. Application Data

(60) Provisional application No. 63/411,983, filed on Sep. 30, 2022.

(51) Int. Cl.
H04L 5/00 (2006.01)
H04L 1/00 (2006.01)
H04W 72/20 (2023.01)

(52) U.S. Cl.
CPC .......... H04L 5/0053 (2013.01); H04L 1/0071 (2013.01); H04W 72/20 (2023.01)

(58) Field of Classification Search
CPC ... H04L 5/0053; H04L 1/0071; H04L 1/0075; H04L 1/0041; H04L 1/0046; H04L 1/0052; H04L 1/0072; H04W 72/20
See application file for complete search history.

(56) References Cited

U.S. PATENT DOCUMENTS

2014/0126487 A1* 5/2014 Chen .................... H04B 7/0697
370/329
2018/0083736 A1* 3/2018 Manolakos ........... H04L 5/0007
(Continued)

FOREIGN PATENT DOCUMENTS

CN 110011757 A * 7/2019 ........... H04L 1/0071
EP 2077640 B1 * 6/2018 ........... H04L 1/0071
(Continued)

OTHER PUBLICATIONS

"3rd Generation Partnership Project; Technical Specification Group Radio Access Network; NR; Physical channels and modulation (Release 17)", 3GPP TS 38.211, V17.1.0, Mar. 2022, pp. 1-135.
(Continued)

*Primary Examiner* — Sujoy K Kundu
*Assistant Examiner* — Vladislav Y Agureyev
(74) *Attorney, Agent, or Firm* — SQUIRE PATTON BOGGS (US) LLP

(57) ABSTRACT

Methods and apparatuses for interleaved control channel element to resource element group mapping within a portion of a control resource set. A method may include determining a first set of parameters having a first configuration for a first control resource set including a plurality of resource element groups. The method also includes determining an interleaver block size of each of a plurality of interleaver blocks. The plurality of interleaver blocks are formed by dividing the control resource set in time and numbering the interleaver blocks. The method further includes mapping the plurality of resource element groups to control channel elements, such that resource element groups of a first interleaver block, which are a subset of the plurality of resource element groups, are mapped to the control channel elements before mapping resource element groups of any subsequent inter-
(Continued)

leaver block of the plurality of interleaver blocks to control channel elements.

17 Claims, 14 Drawing Sheets

(56) References Cited

U.S. PATENT DOCUMENTS

| | | | | |
|---|---|---|---|---|
| 2018/0192409 A1* | 7/2018 | Yang | H04W 72/044 |
| 2018/0359755 A1* | 12/2018 | Sun | H04L 5/0053 |
| 2019/0068327 A1* | 2/2019 | Ho | H04L 1/0009 |
| 2019/0140776 A1* | 5/2019 | Seo | H04L 1/0071 |
| 2019/0313377 A1* | 10/2019 | Abdoli | H04L 1/0071 |
| 2019/0364602 A1* | 11/2019 | Yi | H04W 74/0833 |
| 2019/0394760 A1* | 12/2019 | Hwang | H04L 5/0064 |
| 2020/0021419 A1 | 1/2020 | Taherzadeh Boroujeni et al. | |
| 2020/0045707 A1* | 2/2020 | Hwang | H04W 76/28 |
| 2020/0045708 A1* | 2/2020 | Hwang | H04L 5/10 |
| 2020/0067525 A1* | 2/2020 | Jayasinghe | H03M 13/13 |
| 2020/0100220 A1* | 3/2020 | Takeda | H04W 72/23 |
| 2020/0120642 A1* | 4/2020 | Hwang | H04L 5/005 |
| 2020/0120680 A1* | 4/2020 | Hwang | H04L 1/00 |
| 2020/0220752 A1* | 7/2020 | Shi | H04L 5/0051 |
| 2020/0235759 A1* | 7/2020 | Ye | H03M 13/116 |
| 2020/0266950 A1* | 8/2020 | Hwang | H04L 5/0048 |
| 2020/0314881 A1* | 10/2020 | Bagheri | H04W 72/23 |
| 2020/0374036 A1* | 11/2020 | Seo | H04B 7/0456 |
| 2020/0389874 A1* | 12/2020 | Lin | H04L 5/0053 |
| 2021/0127367 A1* | 4/2021 | Yi | H04W 72/23 |
| 2021/0251005 A1* | 8/2021 | Pan | H04L 1/0071 |
| 2021/0258099 A1 | 8/2021 | Seo et al. | |
| 2021/0266831 A1* | 8/2021 | Zhou | H04W 72/51 |
| 2021/0314114 A1* | 10/2021 | Seo | H04L 1/0071 |
| 2021/0377953 A1 | 12/2021 | Ji et al. | |
| 2022/0046670 A1* | 2/2022 | Lin | H04L 5/0053 |
| 2022/0070909 A1* | 3/2022 | Takeda | H04L 5/0053 |
| 2022/0095288 A1* | 3/2022 | Hwang | H04L 5/00 |
| 2022/0279563 A1 | 9/2022 | Wei et al. | |
| 2023/0100598 A1* | 3/2023 | Omari | H04L 5/0053 |
| | | | 370/329 |
| 2023/0136223 A1* | 5/2023 | Sun | H04W 74/0833 |
| | | | 370/329 |
| 2023/0171048 A1* | 6/2023 | Harada | H04L 1/1822 |
| | | | 370/329 |
| 2024/0364456 A1* | 10/2024 | Li | H04L 1/00 |
| 2025/0167960 A1* | 5/2025 | Zhao | H04L 5/0053 |

FOREIGN PATENT DOCUMENTS

| | | | | | |
|---|---|---|---|---|---|
| EP | 3664550 A1 | * | 6/2020 | | H04W 72/23 |
| EP | 3471297 B1 | * | 1/2022 | | H04L 5/0091 |
| EP | 3379762 B1 | * | 7/2024 | | H04L 5/0092 |
| TW | 202139763 A | * | 10/2021 | | H04W 74/0833 |
| WO | WO-2018151871 A2 | * | 8/2018 | | H04L 5/0085 |
| WO | 2021/201756 A1 | | 10/2021 | | |
| WO | 2021/203356 A1 | | 10/2021 | | |
| WO | 2022/072506 A1 | | 4/2022 | | |
| WO | 2023/037037 A1 | | 3/2023 | | |

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"3rd Generation Partnership Project; Technical Specification Group Radio Access Network; NR; Physical layer procedures for control (Release 17)", 3GPP TS 38.213, V17.1.0, Mar. 2022, pp. 1-245.

"New SID on Study on further NR RedCap UE complexity reduction", 3GPP TSG RAN meeting #94e, RP-213661, Agenda: 8A.1, Ericsson, Dec. 6-17, 2021, 4 pages.

"3rd Generation Partnership Project; Technical Specification Group Radio Access Network; Study on support of reduced capability NR devices (Release 17)", 3GPP TR 38.875, V17.0.0, Mar. 2021, pp. 1-135.

Mozaffari et al., "Blocking Probability Analysis for 5G New Radio (NR) Physical Downlink Control Channel", IEEE International Conference on Communications, Jun. 14-23, 2021, 6 pages.

Extended European Search Report received for corresponding European Patent Application No. 23190166.1, dated Jan. 30, 2024, 8 pages.

* cited by examiner

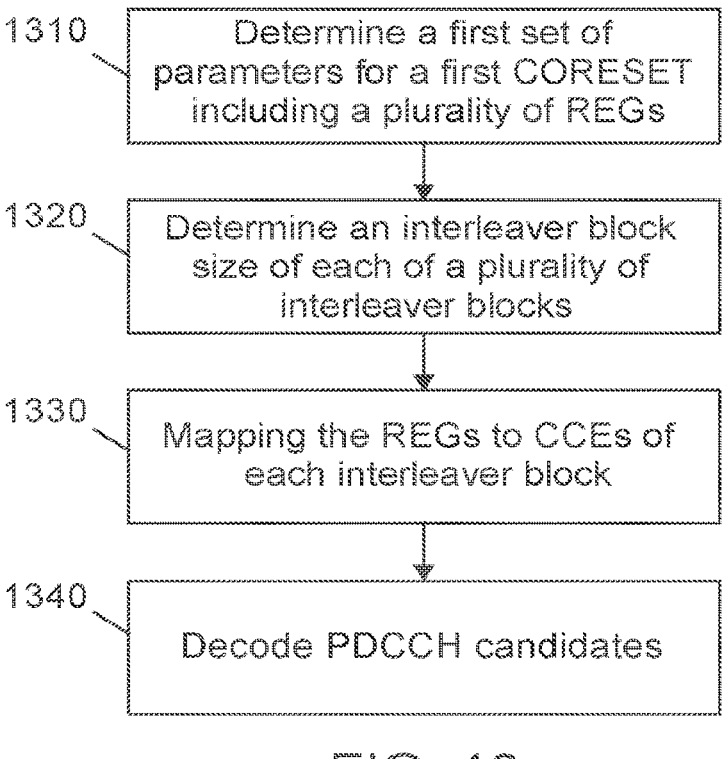

1310 — Determine a first set of parameters for a first CORESET including a plurality of REGs 1320 — Determine an interleaver block size of each of a plurality of interleaver blocks 1330 — Mapping the REGs to CCEs of each interleaver block 1340 — Decode PDCCH candidates

FIG. 13

1410 — Transmit information including a first configuration for a first CORESET including a plurality of REGs 1420 — Determine REGs are to be mapped to CCEs for each interleaver block 1430 — Transmit a PDCCH in CCEs mapped to REGs of one or more interleaver blocks

FIG. 14

METHOD AND APPARATUS FOR INTERLEAVED CCE-TO-REG MAPPING WITHIN A PORTION OF A CONTROL RESOURCE SET

TECHNICAL FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for interleaved control channel element (CCE) to resource element group (REG) mapping within a portion of a control resource set (CORESET).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Certain exemplary embodiments may provide a method comprising determining, by an apparatus, a first set of parameters comprising a first configuration for a first control resource set including a plurality of resource element groups. The method may further comprise determining an interleaver block size of each of a plurality of interleaver blocks. The plurality of interleaver blocks may be formed by dividing the first control resource set in time and numbering the interleaver blocks. The method may also comprise mapping the plurality of resource element groups to control channel elements, such that resource element groups of a first interleaver block of the plurality of interleaver blocks, which are a subset of the plurality of resource element groups, are mapped to the control channel elements before mapping resource element groups of any subsequent interleaver block of the plurality of interleaver blocks to control channel elements.

Certain exemplary embodiments may provide a method comprising transmitting, by an apparatus, information indicating a first configuration for a first control resource set including a plurality of resource element groups. The method may also comprise determining the plurality of resource element groups are to be mapped to control channel elements. Resource element groups of a first interleaver block of a plurality of interleaver blocks, which may be a subset of the plurality of resource element groups, may be mapped to the control channel elements before mapping resource element groups of any subsequent interleaver block of the plurality of interleaver blocks to control channel elements. The method may also comprise, upon the plurality of resource element groups being mapped to the control channel elements, transmitting a physical downlink control channel to the apparatus in control channel elements mapped to resource element groups of one or more interleaver blocks of the plurality of interleaver blocks.

Some exemplary embodiments may provide an apparatus including at least one processor, and at least one computer readable storage medium. The at least one computer readable storage medium storing instructions that, when executed by the at least one processor, cause the apparatus at least to determine a first set of parameters comprising a first configuration for a first control resource set including a plurality of resource element groups. The apparatus may also be caused to determine an interleaver block size of each of a plurality of interleaver blocks. The plurality of interleaver blocks may be formed by dividing the first control resource set in time and numbering the interleaver blocks. The apparatus may also be caused to map the plurality of resource element groups to control channel elements, such that resource element groups of a first interleaver block of the plurality of interleaver blocks, which are a subset of the plurality of resource element groups, are mapped to the control channel elements before mapping resource element groups of any subsequent interleaver block of the plurality of interleaver blocks to control channel elements.

Some exemplary embodiments may provide an apparatus including at least one processor, and at least one computer readable storage medium. The at least one computer readable storage medium storing instructions that, when executed by the at least one processor, cause the apparatus at least to transmit information indicating a first configuration for a first control resource set including a plurality of resource element groups. The apparatus may also be caused to determine the plurality of resource element groups are to be mapped to control channel elements. Resource element groups of a first interleaver block of a plurality of interleaver blocks, which may be a subset of the plurality of resource element groups, may be mapped to the control channel elements before mapping resource element groups of any subsequent interleaver block of the plurality of interleaver blocks to control channel elements. Further, the apparatus may be caused to, upon the plurality of resource element groups being mapped to the control channel elements, transmit a physical downlink control channel to the apparatus in control channel elements mapped to resource element groups of one or more interleaver blocks of the plurality of interleaver blocks.

Various exemplary embodiments may provide an apparatus including a first determining means for determining a first set of parameters comprising a first configuration for a first control resource set including a plurality of resource element groups. The apparatus may also include a second determining means for determining an interleaver block size of each of a plurality of interleaver blocks. The plurality of interleaver blocks may be formed by dividing the first control resource set in time and numbering the interleaver blocks. The apparatus may also include a mapping means for mapping the plurality of resource element groups to control channel elements, such that resource element groups of a first interleaver block of the plurality of interleaver blocks, which are a subset of the plurality of resource element groups, are mapped to the control channel elements before mapping resource element groups of any subsequent inter-leaver block of the plurality of interleaver blocks to control channel elements.

Various exemplary embodiments may provide an appa-ratus including a first transmitting means for transmitting information indicating a first configuration for a first control resource set including a plurality of resource element groups. The apparatus may also include a determining means for determining the plurality of resource element groups are to be mapped to control channel elements. Resource element groups of a first interleaver block of a plurality of interleaver blocks, which may be a subset of the plurality of resource element groups, may be mapped to the control channel elements before mapping resource element groups of any subsequent interleaver block of the plurality of interleaver blocks to control channel elements. Upon the plurality of resource element groups being mapped to the control channel elements, the apparatus may further include a second transmitting means for transmitting a physical downlink control channel to the apparatus in control channel elements mapped to resource element groups of one or more interleaver blocks of the plurality of interleaver blocks.

Certain exemplary embodiments may provide a non-transitory computer readable storage medium storing instruction that, when executed by at least one processor of an apparatus, causes the apparatus at least to determine a first set of parameters comprising a first configuration for a first control resource set including a plurality of resource element groups. The apparatus may also be caused to determine an interleaver block size of each of a plurality of interleaver blocks. The plurality of interleaver blocks may be formed by dividing the first control resource set in time and numbering the interleaver blocks. The apparatus may further be caused to map the plurality of resource element groups to control channel elements, such that resource element groups of a first interleaver block of the plurality of interleaver blocks, which are a subset of the plurality of resource element groups, are mapped to the control channel elements before mapping resource element groups of any subsequent interleaver block of the plurality of interleaver blocks to control channel elements.

Certain exemplary embodiments may provide a non-transitory computer readable storage medium storing instruction that, when executed by at least one processor of an apparatus, causes the apparatus at least to transmit information indicating a first configuration for a first control resource set including a plurality of resource element groups. The apparatus may also be caused to determine the plurality of resource element groups are to be mapped to control channel elements. Resource element groups of a first interleaver block of a plurality of interleaver blocks, which may be a subset of the plurality of resource element groups, may be mapped to the control channel elements before mapping resource element groups of any subsequent inter-leaver block of the plurality of interleaver blocks to control channel elements. The apparatus may also be caused to, upon the plurality of resource element groups being mapped to the control channel elements, transmit a physical down-link control channel to the apparatus in control channel elements mapped to resource element groups of one or more interleaver blocks of the plurality of interleaver blocks.

Some exemplary embodiments may provide an apparatus including a first circuitry configured to perform determining a first set of parameters comprising a first configuration for a first control resource set including a plurality of resource element groups. The apparatus may also include a second circuitry configured to perform determining an interleaver block size of each of a plurality of interleaver blocks. The plurality of interleaver blocks may be formed by dividing the first control resource set in time and numbering the interleaver blocks. The apparatus may further include a third circuitry configured to perform mapping the plurality of resource element groups to control channel elements, such that resource element groups of a first interleaver block of the plurality of interleaver blocks, which are a subset of the plurality of resource element groups, are mapped to the control channel elements before mapping resource element groups of any subsequent interleaver block of the plurality of interleaver blocks to control channel elements.

Some exemplary embodiments may provide an apparatus including a first circuitry configured to perform transmitting information indicating a first configuration for a first control resource set including a plurality of resource element groups. The apparatus may further include a second circuitry configured to perform determining the plurality of resource element groups are to be mapped to control channel ele-ments. Resource element groups of a first interleaver block of a plurality of interleaver blocks, which may be a subset of the plurality of resource element groups, may be mapped to the control channel elements before mapping resource element groups of any subsequent interleaver block of the plurality of interleaver blocks to control channel elements. The apparatus may also include a third circuitry configured to perform, upon the plurality of resource element groups being mapped to the control channel elements, transmitting a physical downlink control channel to the apparatus in control channel elements mapped to resource element groups of one or more interleaver blocks of the plurality of interleaver blocks.

BRIEF DESCRIPTION OF THE DRAWINGS

For proper understanding of example embodiments, ref-erence should be made to the accompanying drawings, as follows:

FIG. 13 illustrates an example of a flow diagram of a method according to various exemplary embodiments.

FIG. 14 illustrates another example of a flow diagram of a method according to some exemplary embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and non-transitory computer program products for interleaved CCE-to-REG mapping within a portion of a CORESET.

Reduced capability NR (RedCap) user equipment (UE) may be applied in new IoT use cases in vertical industries, such as industrial wireless sensors, video surveillance, and wearables. RedCap UE may be targeted to meet design requirements of lower device cost and complexity compared with eMBB and URLLC devices. RedCap UE may also have fewer receiver antennas than an NR UE. The peak data rates that can be supported may be much higher than necessary for many use cases, where lower cost and energy consumption may be desired to further expand the market for RedCap UEs. Thus, it is desirable to reduce the complexity for RedCap UEs targeting a lower peak data rate, e.g., 10 Mbps.

Figure 1:
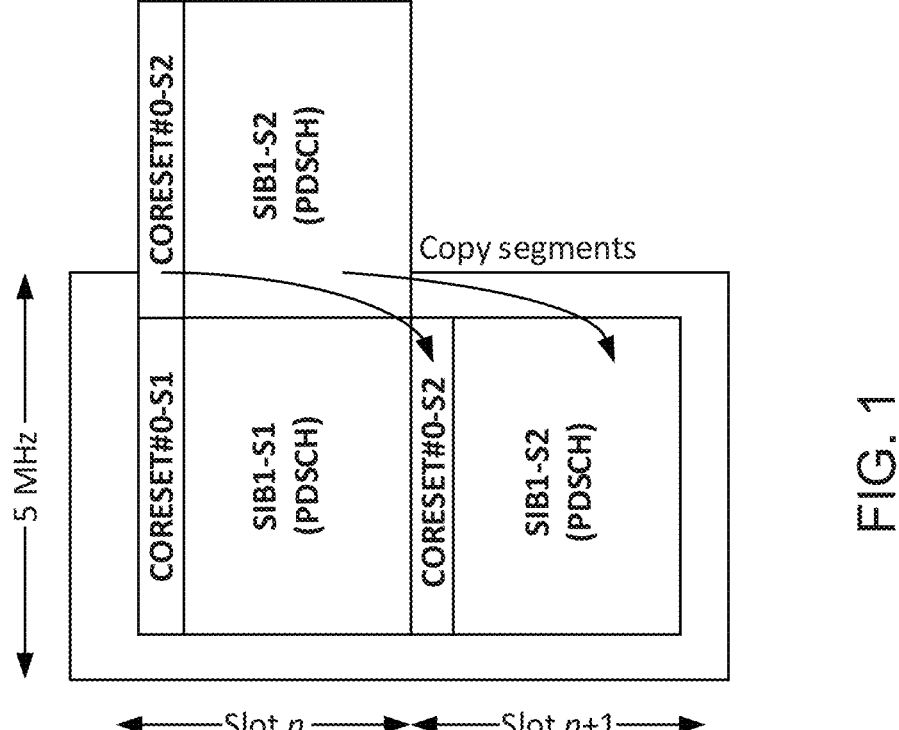
FIG. 1 illustrates an example of a CORESET remapped in a 5 MHz bandwidth according to a related technique.

FIG. 1 illustrates a technique for enabling a RedCap UE with a bandwidth (e.g., 5 MHz) less than the CORESET #0 bandwidth to receive a transmission in the CORESET #0 by dividing the CORESET #0 into multiple narrowband segments. A narrowband segment may be a segment of CORESET #0 with the same length in time (measured in symbols) as CORESET #0 and a frequency span that may not exceed the UE bandwidth. The narrowband segments may be remapped to within the UE bandwidth at different times. The CORESET #0 for the RedCap UE (referred to as CORESET #0-RedCap) may include all of the narrowband segments mapped to the UE bandwidth at different times.

The control channel elements (CCEs) of the CORESET #0 may also be remapped to the resource element groups (REGs) in CORESET #0-RedCap and the corresponding PDCCH candidates in CORESET #0-RedCap may be determined. The RedCap UE may decode the PDCCH candidates by buffering all the narrowband segments within the bandwidth due to the CCEs for each PDCCH candidate being spread across all the remapped narrowband segments.

Figure 2:
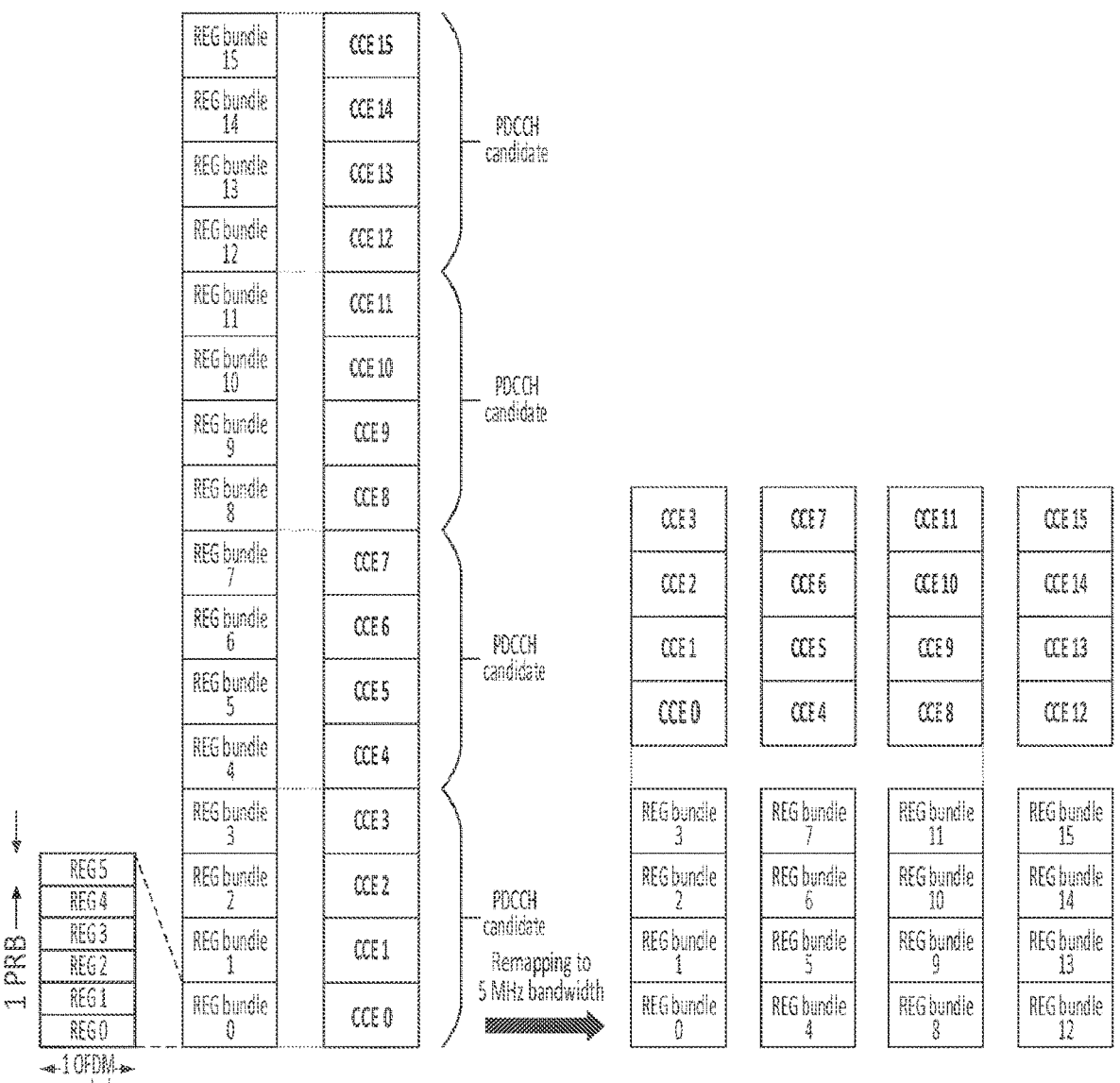
FIG. 2 illustrates an example of physical downlink control channel (PDCCH) candidates remapped in a 5 MHz band-width using non-interleaved CCE-to-REG mapping.

According to various exemplary embodiments, the REGs may be numbered in increasing order of segments starting with the first segment. For non-interleaved CCE-to-REG mapping for CORESET #0, the CCEs may also be numbered contiguously in increasing order of segments starting with the first segment. FIG. 2 illustrates an example of an aggregation level of 4 (the smallest aggregation level for Type0-PDCCH scheduling SIB1) or smaller (for Type2-PDCCH scheduling of random access response message (Msg2) and/or the contention response (Msg4)), where the PDCCH candidates include CCEs within one segment.

Figure 3:
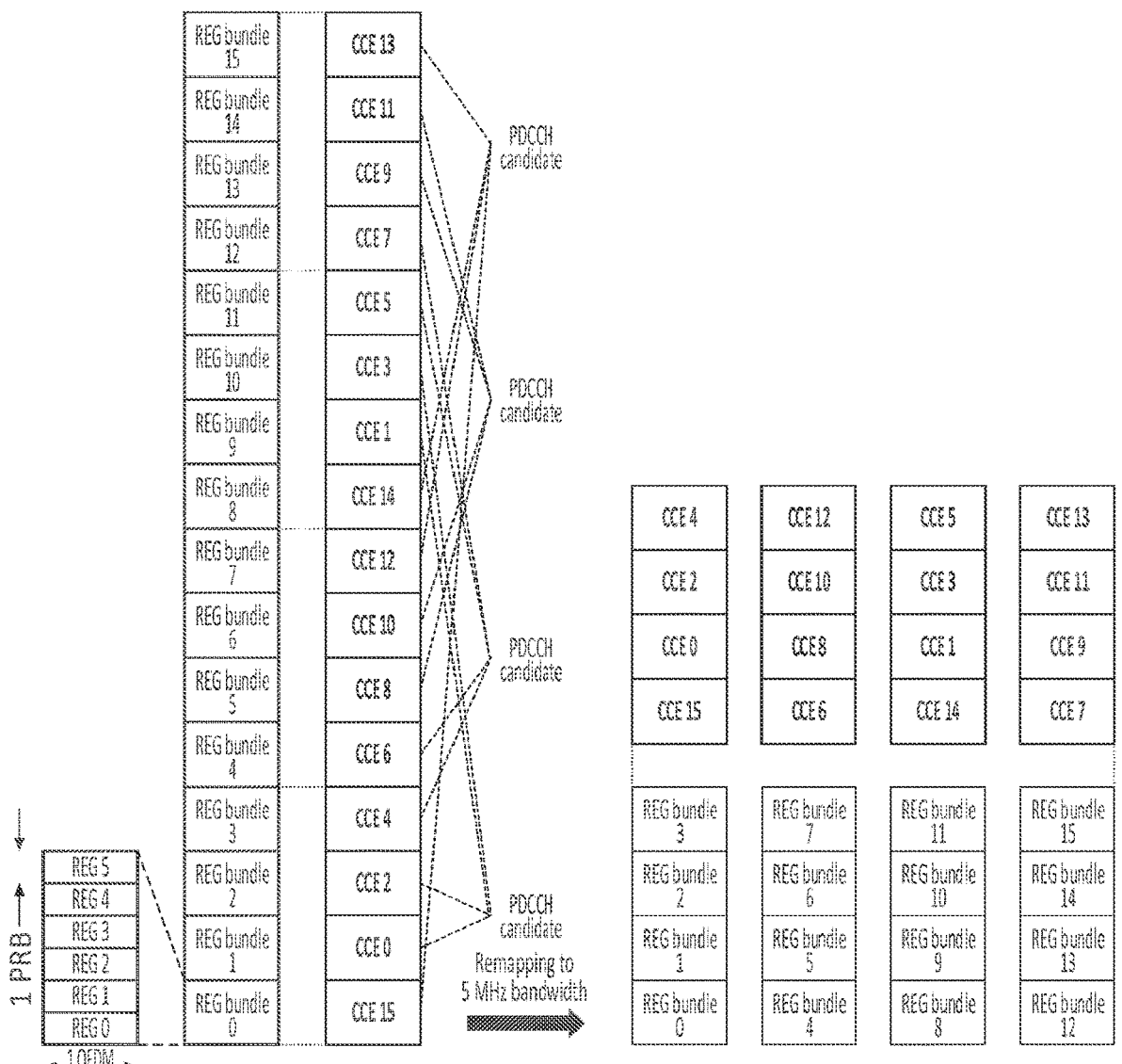
FIG. 3 illustrates an example of PDCCH candidates remapped in a 5 MHz bandwidth using interleaved CCE-to-REG mapping.

FIG. 3 illustrates a similar example for interleaved CCE-to-REG mapping for CORESET #0. In interleaved CCE-to-REG mapping for CORESET #0, the REGs may include CCEs that are interleaved across the CORESET. FIG. 3 shows an aggregation level of 4 for the same CORESET #0 configuration as shown in FIG. 2, and where REG bundle-size L=6, interleaver size R=2, and shift index $n_{shift}=1$ for interleaved CCE-to-REG mapping based on 3GPP NR specifications. The CCEs included in different PDCCH candidates of aggregation level 4 or higher may be spread over some or all of the narrowband segments. As such, the RedCap UE may need to buffer all the narrowband segments in order to decode PDCCH candidates.

Figure 4:
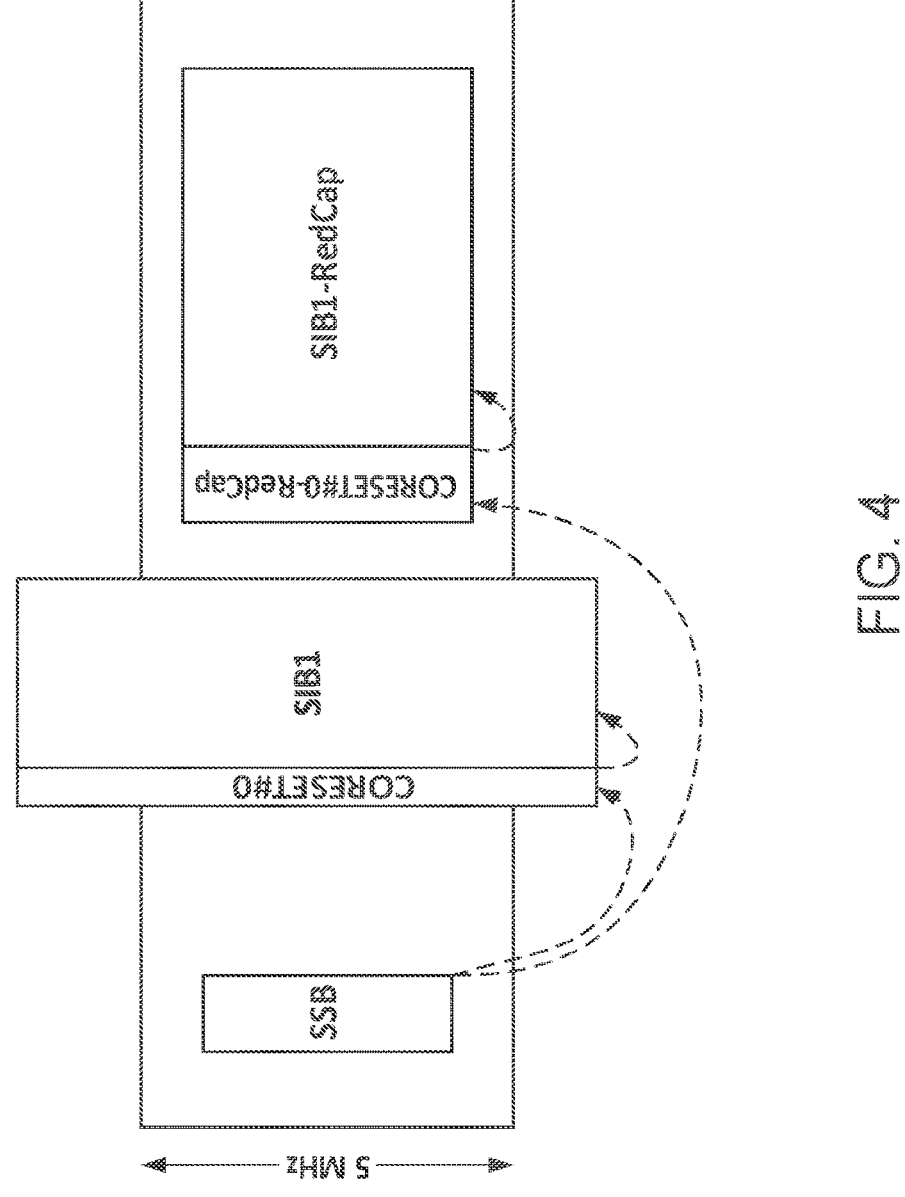
FIG. 4 illustrates an example of a CORESET remapped in a 5 MHz bandwidth according to another related technique.

FIG. 4 illustrates another technique for enabling a Red-Cap UE with bandwidth (e.g., 5 MHz) less than the CORE-SET #0 bandwidth to receive a transmission in CORESET #0. In this technique, a separate CORESET #0 for RedCap UE may be configured within the 5 MHz bandwidth. The location and bandwidth of CORESET #0-RedCap may be determined by reinterpreting PDCCH-ConfigSIB1, which may be contained in a master information block (MIB), differently based on a new configuration table defined for the RedCap UE.

Figure 5:
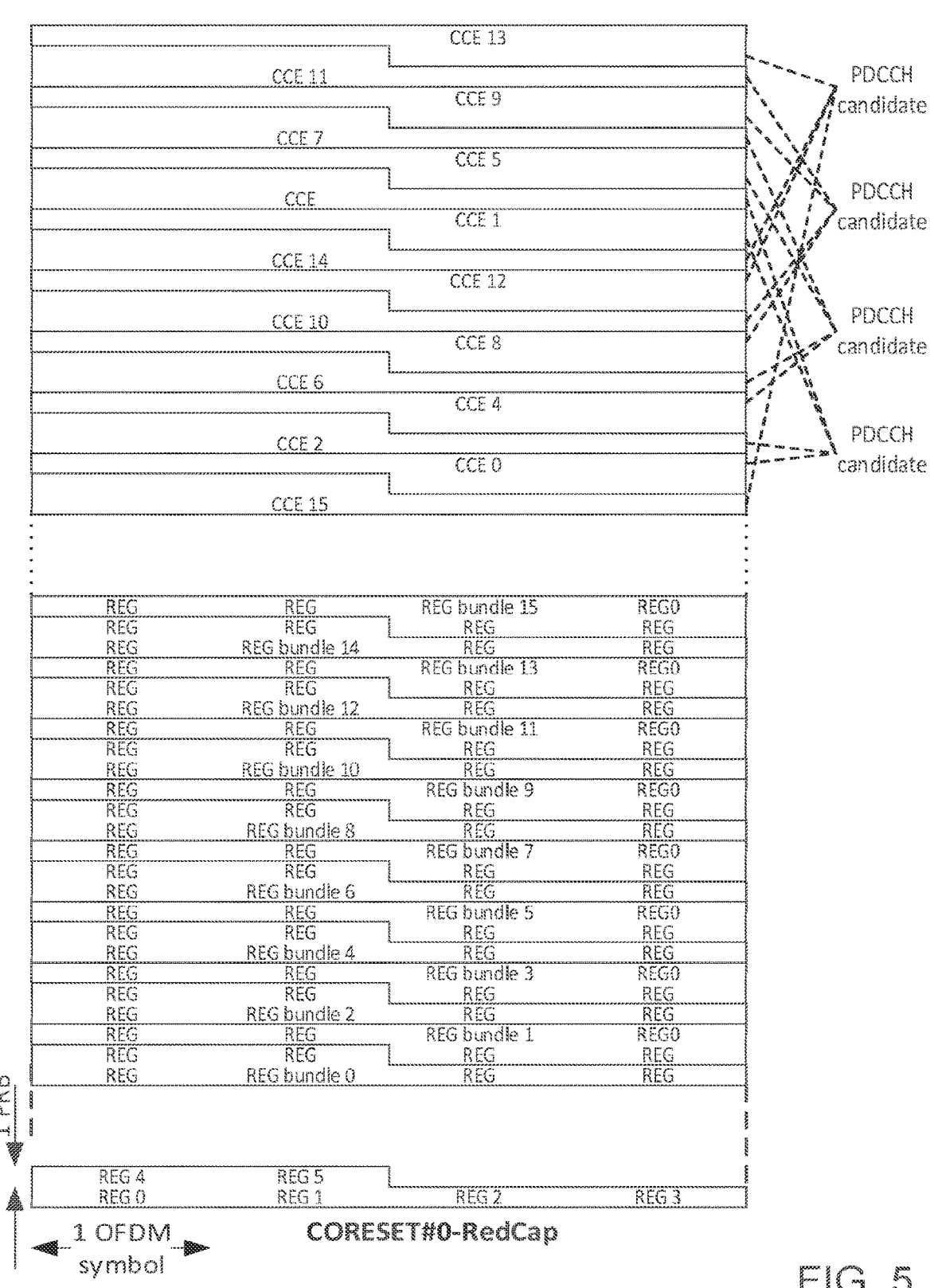
FIG. 5 illustrates an example of PDCCH candidates remapped in a 5 MHz bandwidth using interleaved CCE-to-REG mapping according to the other technique of FIG. 4.

In exemplary embodiments following a conventional rule, REGs may be numbered in increasing order first in time and then in frequency, starting with the first symbol and the lowest number PRB. Therefore, the REGs in CORESET #0-RedCap may be numbered across all symbols in the CORESET. As illustrated in FIG. 5, the CCEs of the technique shown in FIG. 4, which are mapped to all the REGs in CORESET #0-RedCap, may also be spread across all of the symbols of the CORESET in either non-interleaved or interleaved CCE-to-REG mapping.

Various exemplary embodiments described below with respect to FIGS. 6-15 may provide several technical improvements, enhancements, and/or advantages as compared to the above-described techniques and the conventional technology. Certain technical improvements, enhancements, and/or advantages of the features described below may result in computer implemented improvements to computer technology and/or mobile or wireless telecommunication technology.

Various exemplary embodiments relate to apparatuses, systems, and/or methods for interleaved CCE-to-REG mapping within a portion of a CORESET. When UE connects to or enters a 3rd Generation Partnership Project (3GPP) network, it may perform synchronization and acquire the minimum system information from an MIB carried on a physical broadcast channel (PBCH). Synchronization may be performed using a synchronization signal block (SSB), which may include the PCBH and a pair of downlink signals—a primary synchronization signal (PSS) and a secondary synchronization channel (SSS). The MIB may contain configuration information for a CORESET, e.g., CORE-SET #0, in which a PDCCH may be transmitted for scheduling a system information block (SIB1), Msg2, and Msg4. SIB1 may include remaining minimum system information (RMSI).

Some exemplary embodiments, as discussed herein, may improve the speed of decoding while reducing buffering by, for example, implementing interleaved CCE-to-REG mapping for CORESET #0-RedCap such that interleaving may be restricted to one or more segments. Although the exemplary embodiments are described for CORESET #0-RedCap derived from CORESET #0, the features and processes may also be applied to any other CORESET that may be remapped to multiple successive narrowband segments in time. For other CORESETs, a configuration may be provided in the SIB or via other higher-layer (e.g., radio resource control (RRC) signaling with an indication that the CCE-to-REG mapping is a new mapping (e.g. Type 2 mapping).

Various exemplary embodiments may provide methods, apparatuses, and systems for interleaved CCE-to-REG mapping within a subset of all REGs of a CORESET. The subset of REGs may define an interleaver block including a portion of the CORESET bandwidth. When a wideband CORESET is remapped to multiple concatenated narrowband segments, interleaved mapping of CCEs to REGs may be performed within individual interleaver blocks. Each of the individual interleaver blocks may include one or more consecutive narrowband segments, as determined by the interleaver block size.

Some exemplary embodiments may reduce the complexity of RedCap UE by focusing on reducing the UE bandwidth in a lower frequency band, such as frequency range (FR1). For example, in FR1, the UE bandwidth may be limited to 5 MHz. This exemplary limit on the RedCap UE bandwidth in FR1 is not intended to limit the scope of the embodiments defined herein. In the following description, a UE bandwidth of 5 MHz will be used for exemplary purposes. Other bandwidth limits may be used as necessary or desirable, and/or the features described herein may be applied to other frequency ranges or bands.

During synchronization of the RedCap UE, the MIB may contain configuration information for CORESET #0. For a RedCap UE with 5 MHz bandwidth, only the CORESET #0 configurations in which the bandwidth is less than 5 MHz may be supported without performance degradation.

In various exemplary embodiments, the configuration information of the CORESET may define the size of the CORESET in frequency and time. Frequency can define the number of contiguous physical resource blocks (PRBs) and time can define the number of contiguous symbols in the CORESET. PRB sizes for CORESET #0 may be specified and supported depending on subcarrier spacing (SCS). The aggregation level for PDCCH may be the number of CCEs that may be used to transmit the PDCCH.

In certain exemplary embodiments, a CCE may include 6 REGs, where each REG may have 12 resource elements (REs) of a PRB in one orthogonal frequency division multiplexing (OFDM) symbol. The REGs in a CORESET may be numbered in increasing order—first in time, and then in frequency—starting with the first symbol and the lowest number PRB. The REGs in a CORESET may be mapped to CCEs either in an interleaved or non-interleaved manner through REG bundles.

In some exemplary embodiments, the CORESET #0 configuration may be available to the UE. The CORESET #0 configuration parameters for interleaved CCE-to-REG mapping may include REG bundle size parameter L and the interleaver size R. As discussed herein, L may be set to 6 for CORESET #0 and R may be set to 2 for CORESET #0.

The REGs in a CORESET may be mapped according to, for example, TS 38.211 as follows:

A REG bundle i is defined as REGs {iL, iL+1, . . . , iL+iL−1}, where L is the REG bundle size, $$i = 0, 1, \ldots, N_{REG}^{CORESET}/L - 1, \text{ and } N_{REG}^{CORESET} = N_{RB}^{CORESET} N_{symb}^{CORESET}$$

is the number of REGs in the CORESET. A CCE j consists of REG bundles {f(6j/L), f(6j/L+1), . . . , (6j/L+6/L−1)}, where f(•) is an interleaver. For non-interleaved CCE-to-REG mapping, L=6 and f(x)=x.

For interleaved CCE-to-REG mapping, L∈{2,6} for $$N_{symb}^{CORESET} = 1 \text{ and } L \in \left\{ N_{symb}^{CORESET}, 6 \right\} \text{ for } N_{symb}^{CORESET} \in \{2, 3\}.$$

The interleaver may be defined by:

$$f(x) = (rC + c + n_{shift}) \bmod \left( N_{REG}^{CORESET}/L \right)$$

$$x = cR + r$$

$$r = 0, 1, \ldots, R - 1$$

$$c = 0, 1, \ldots, C - 1$$

$$C = N_{REG}^{CORESET}/(LR)$$

where R∈{2,3,6}.

The UE is not expected to handle configurations resulting in the quantity C not being an integer. For a CORESET configured by the ControlResourceSet IE:

$$N_{RB}^{CORESET}$$

is given by the higher-layer parameter frequencyDomain-Resources;

$$N_{symb}^{CORESET}$$

is given by the higher-layer parameter duration, where $$N_{symb}^{CORESET} = 3$$

is supported only if the higher-layer parameter dmrs-TypeA-Position equals 3;

interleaved or non-interleaved mapping is given by the higher-layer parameter cce-REG-MappingType;

L equals 6 for non-interleaved mapping and is given by the higher-layer parameter reg-BundleSize for interleaved mapping;

R is given by the higher-layer parameter interleaverSize;

$n_{shift} \in \{0, 1, \ldots, 274\}$ is given by the higher-layer parameter shiftIndex if provided, otherwise $$n_{shift} = N_{ID}^{cell};$$

and for both interleaved and non-interleaved mapping, the UE may assume the same precoding being used within a REG bundle if the higher-layer parameter precoder-Granularity equals sameAsREG-bundle, and the same precoding being used across the all resource-element groups within the set of contiguous resource blocks in the CORESET, and that no resource elements in the CORESET overlap with an SSB or LTE cell-specific reference signals as indicated by the higher-layer parameter lte-CRS-ToMatchAround, lte-CRS-Pattern-List1, or lte-CRS-PatternList2, if the higher-layer parameter precoderGranularity equals allContiguousRBs.

For CORESET #0 configured by the ControlResource-SetZero IE:

$$N_{RB}^{CORESET} \text{ and } N_{symb}^{CORESET}$$

are defined by clause 13 of [5, TS 38.213];
the UE may assume interleaved mapping;
L=6;
R=2;

$$n_{shift} = N_{ID}^{cell};$$

the UE may assume normal cyclic prefix when CORESET #0 is configured by MIB or SIB1; and
the UE may assume the same precoding being used within a REG bundle.

The CORESET #0 may be configured only to a set limit of PRBs, such as 96 PRBs. When the CORESET #0 size exceeds 24 PRBs, which may be the limit for a 5 MHz bandwidth, only a portion of the CORESET may be received by the RedCap UE at 5 MHz. If the RedCap UE attempts to decode SIB1 by assuming that the coded bits modulated and transmitted on subcarriers outside this bandwidth are punctured, the decoding performance may be significantly degraded.

The configuration of CORESET #0-RedCap may be set by a specification (e.g., new tables). Alternatively, the configuration of CORESET #0-RedCap may be implicitly derived based on a mapping of CORESET #0 to time-frequency resources with the UE bandwidth. The mapping may comprise determining the CORESET #0-RedCap size and the CORESET #0-RedCap time-frequency offsets.

The CORESET #0-RedCap size may be based on the CORESET #0 configuration. The CORESET #0 configuration may include the number of PRBs and OFDM symbols in CORESET #0 that define the REGs, and the CORESET #0-RedCap size can be determined such that the number of REGs may be the same as in CORESET #0. The CORESET #0-RedCap may include multiple narrowband segments concatenated in time. The number of PRBs in each narrowband segment may be determined based on the UE bandwidth, such that the narrowband segment does not exceed the UE bandwidth. The number of symbols in each narrowband segment may be the same as the number of symbols configured for CORESET #0.

The CORESET #0-RedCap time-frequency offset(s) may be based on the time-frequency location of CORESET #0 and the number of PRBs. The offset(s) may also be based on the RedCap bandwidth part (BWP) location, since the RedCap BWP may not be aligned with CORESET #0.

The CORESET #0-RedCap may be divided in time into multiple interleaver blocks where the interleaver blocks are numbered sequentially in increasing order in time. Each interleaver block may have a size $$N_{RB}^{BLOCK}$$

(in PRBs) that is smaller than the CORESET #0 size $$N_{RB}^{CORESET}$$

(in PRBs), where the CORESET #0 size $$N_{RB}^{CORESET}$$

may be an integer multiple of the interleaver block size $$N_{RB}^{BLOCK}.$$

As discussed above, the REGs in CORESET #0-RedCap may be numbered in increasing order first in time and then in frequency within each interleaver block. The numbering may start with the first symbol and the lowest number PRB in the first interleaver block.

The interleaver block size may be determined through multiple methods, either individually or in combination. The interleaver block size may be predefined in the specification or implicitly determined based on parameters, which may be broadcast or known to the UE. An example of a broadcast parameter may be a parameter determined or provided in the MIB, and an example of a parameter known to the UE may be a parameter based on the UE bandwidth.

The interleaver block size may also be preset according to a required quality of service (QoS), such as data requiring low latency that may use a smaller interleaver block size, or a UE capability, such as the UE having a smaller buffer that may use a smaller interleaver block size.

The interleaver block size may also be implicitly determined as a multiple of the REG bundle size parameter L and the interleaver size parameter R. Further, the interleaver block size may also be implicitly determined as a proper factor of the CORESET #0 size $$N_{RB}^{CORESET}.$$

When CORESET #0-RedCap includes multiple narrowband segments, the interleaver block may also be implicitly determined to include one or more successive narrowband segments. The narrowband segments comprising the interleaver block may be either contiguous or separated in time.

Interleaved CCE-to-REG mapping may be applied separately within each interleaver block. Within each interleaver block, the interleaved CCE-to-REG mapping may be performed by the following processes. The CCEs starting from the index 0 may be mapped to REGs in order starting with the first interleaver block such that all REGs in the interleaver block can be mapped to CCEs before considering the REGs in an interleaver block with a higher index. Each CCE may be mapped to REGs in an interleaver block if all the REGs in the interleaver block with a smaller index have been mapped to CCEs with smaller indices.

Each interleaver block may include multiple narrowband segments, and the interleaved mapping may be achieved across all of the narrowband segments in each interleaver block. One or both of the REG bundle size parameter L and the interleaver size parameter R defined for CCE-to-REG CORESET #0 may be reused. Alternatively, a separate REG bundle size or interleaver size may be defined. Further, other parameters for interleaved mapping of CORESET #0 may be reused for interleaved mapping of CORESET #0-Red-Cap.

By the interleaved CCE-to-REG mapping being applied separately within each interleaver block, the UE may treat each set of OFDM symbols of an interleaver block independently and a base station may assign OFDM symbols in CORESET #0-RedCap region to PDSCH when they are not used by PDCCH. The timing for PDSCH transmission may be based on the OFDM symbol corresponding to the detected PDCCH.

Figure 6:
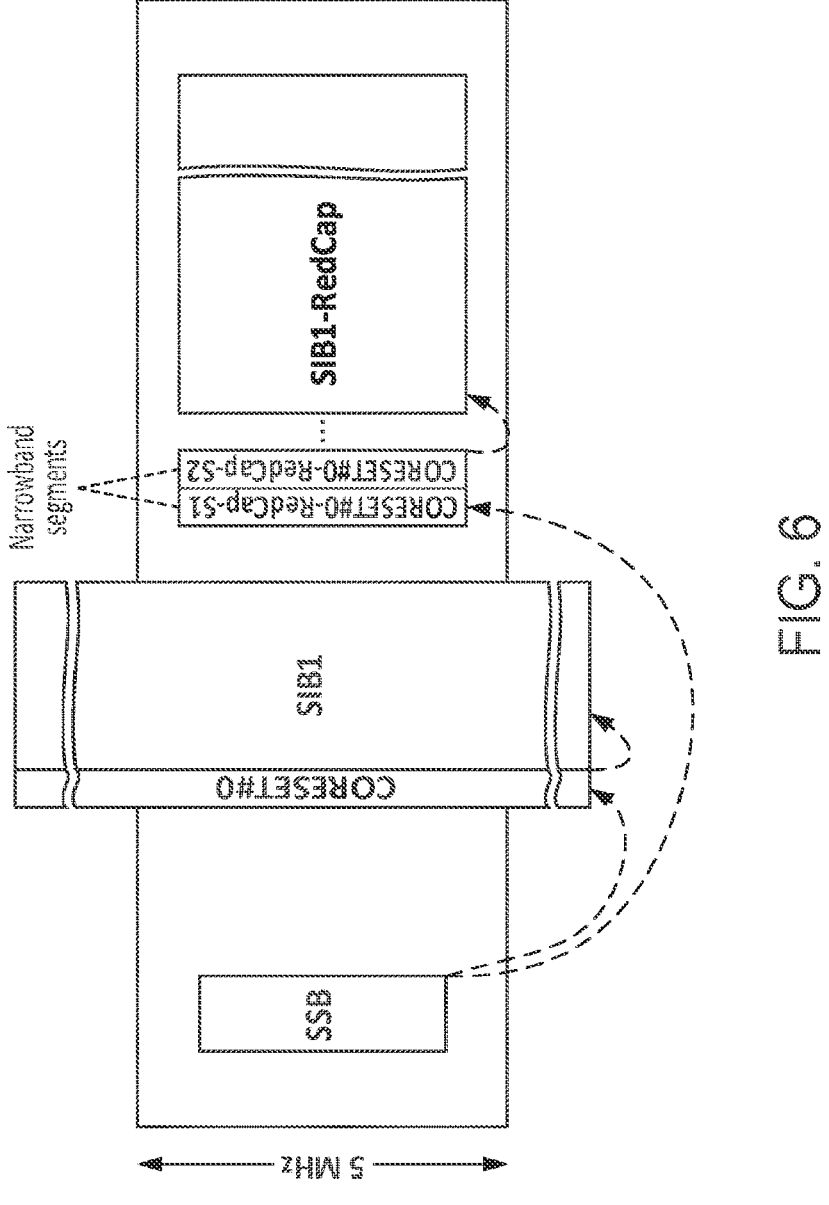
FIG. 6 illustrates an exemplary embodiment including multiple narrowband segments in the 5 MHz bandwidth.

FIG. 6 illustrates an example according to certain embodiments in which the CORESET #0-RedCap may be split into narrowband segments having a length in time that follows the legacy CORESET definition. When the maximum length of CORESET #0-RedCap in time exceeds the maximum length of a CORESET, it may be considered an extended CORESET. In various exemplary embodiments, the CORESET #0-RedCap may be an extended CORESET. Dividing the CORESET #0-RedCap into narrowband segments may enable REG numbering within each narrowband segment and in increasing order of narrowband segments. This may result in each of the narrowband segments achieving backward-compatibility with, and conformance to, the legacy CORESET definition. The narrowband segments may be either contiguous or separated in time.

CORESET #0 may be configured by the PDCCH-ConfigSIB1 IE in MIB. As discussed above, the size of CORESET #0 is $$N_{RB}^{CORESET}$$

PRBs in the frequency domain and $$N_{symb}^{CORESET}$$

OFDM symbols in the time domain. When the bandwidth spanned by $$N_{RB}^{CORESET}$$

PRBs exceeds the RedCap UE channel bandwidth, a separate CORESET #0-RedCap may be defined including multiple narrowband segments that are concatenated in time. The bandwidth of each narrowband segment may not exceed the RedCap UE channel bandwidth. Each narrowband segment may have a size of $$N_{RB}^{NB}$$

PRBs in the frequency domain and $$N_{symb}^{CORESET}$$

OFDM symbols in the time domain.

$$N_{RB}^{NB}$$

may be defined to be a sub-multiple of $$N_{RB}^{CORESET}$$

and the number of narrowband segments may be set so that the number of REGs in CORESET #0-RedCap can be the same as the number of REGs in CORESET #0.

The interleaver block may comprise M≥1 narrowband segments, so that the interleaver block size $$N_{RB}^{BLOCK} = MN_{RB}^{NB}.$$

The allowed values for M may be limited such that the number of interleaver blocks in CORESET #0-RedCap, $$B = N_{RB}^{CORESET}/N_{RB}^{BLOCK},$$

must be an integer. Referring to the example shown in FIG. 3, M may be 1 or 2, and $$N_{RB}^{BLOCK}$$

may be a multiple of the product of the REG bundle size parameter L and the interleaver size parameter R. In this example, when L=6 and R=2 for CORESET #0, $$N_{RB}^{BLOCK}$$

may be a multiple of 12.

In this example, the number of REGs in an interleaver block may be determined by $$N_{REG}^{BLOCK} = N_{RB}^{BLOCK} N_{symb}^{CORESET}.$$

The interleaver may be defined by:

$$f'(x) = bRC' + (rC' + c' + n_{shift})\mathrm{mod}(N_{REG}^{BLOCK}/L)$$

$$x = bRC' + c'R + r$$

$$r = 0, 1, \ldots, R-1$$

$$c' = 0, 1, \ldots, C'-1$$

$$b = 0, 1, \ldots, B-1$$

$$C' = N_{REG}^{BLOCK}/(LR)$$

$$B = N_{RB}^{CORESET}/N_{RB}^{BLOCK}$$

The CCE with index j may consist of the REG bundle f'(j).

Applying these equations to this example, CCEs may be mapped first to REG bundles and correspondingly to REG in interleaver block 0. When all CCEs are mapped to the REGs in interleaver block 0, CCEs may continue to be mapped to REGs in interleaver block 1, and so on. A CCE may be mapped to REGs in an interleaver block when all the REGs in the previous interleaver block have already been mapped to CCEs. This may achieve interleaved mapping across all the REGs within an interleaver block and across all the narrowband segments of the interleaver block.

Figure 7:
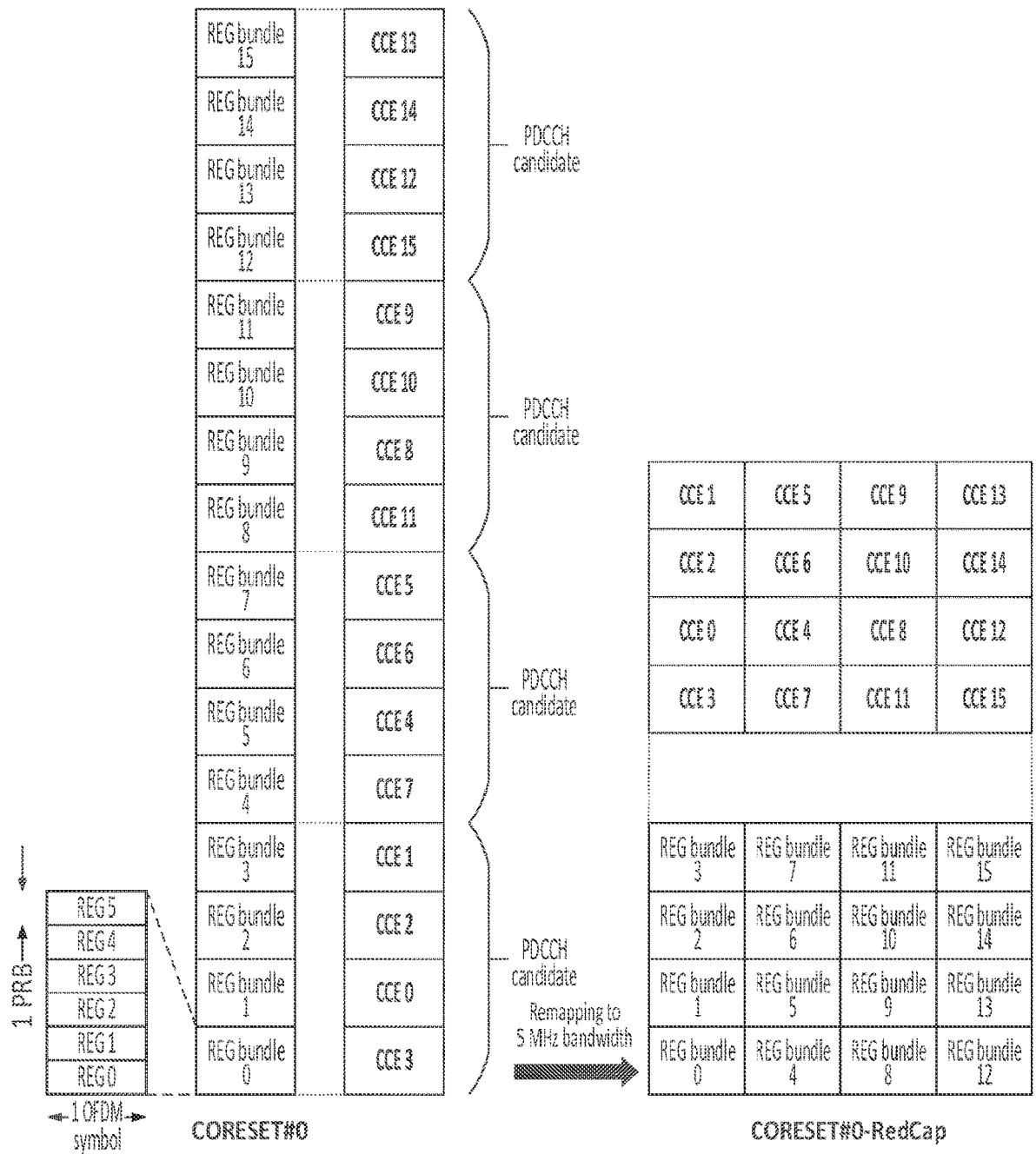
FIG. 7 illustrates an exemplary embodiment of PDCCH candidates remapped using interleaved CCE-to-REG map-ping at an aggregation level of 4.

FIG. 7 illustrates a mapping of the CCEs to REG bundles according to certain exemplary embodiments applied to the example shown in FIG. 3 in which the PDCCH candidates may have an aggregation level of 4. As shown in FIG. 7, all the CCEs for each PDCCH candidate may be limited to one interleaver block, which includes one narrowband segment in this example. The various exemplary embodiments described herein are not limited to this example, and may include additional narrowband segments included in each interleaver block.

Figure 8:
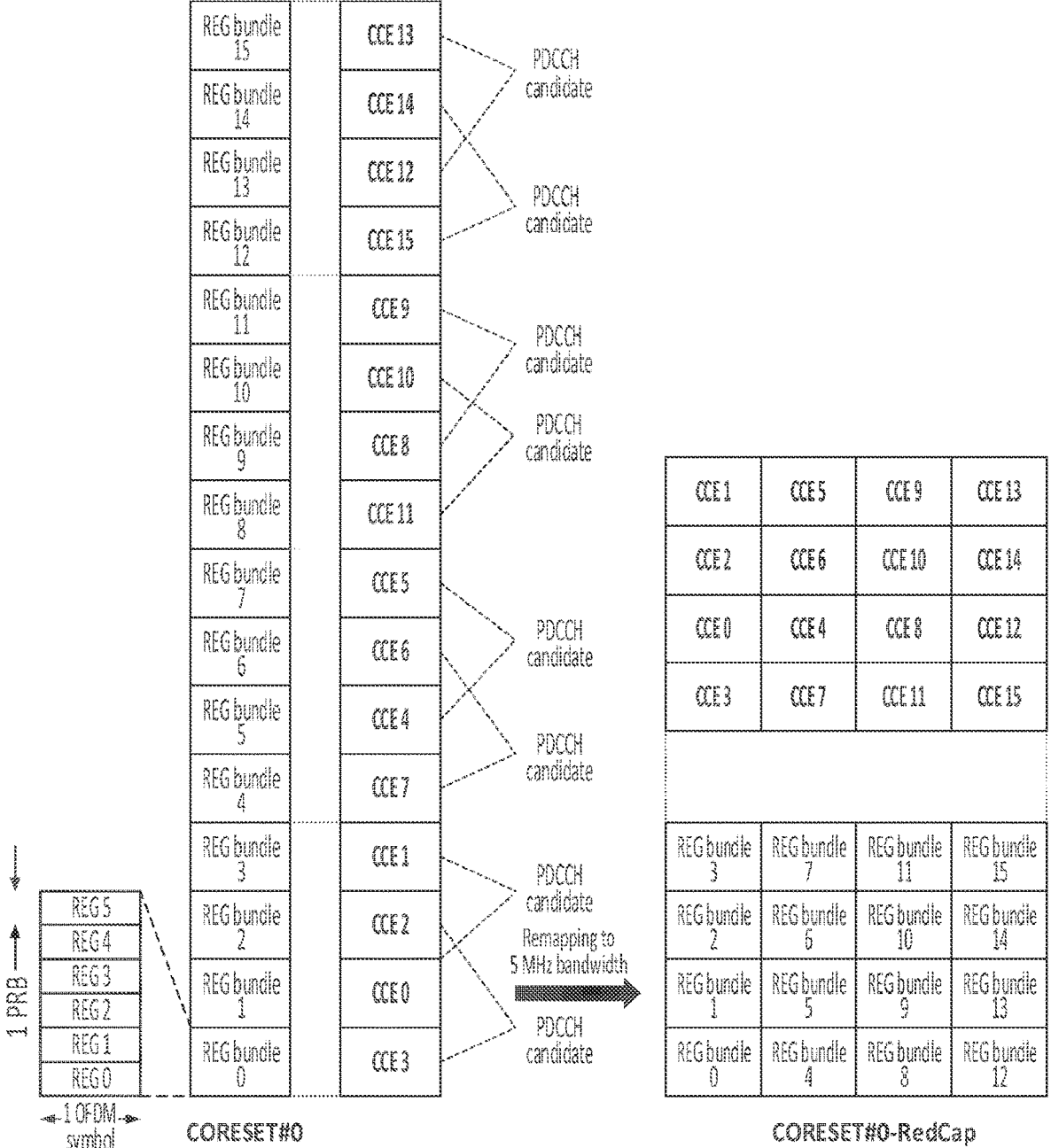
FIG. 8 illustrates an exemplary embodiment of PDCCH candidates remapped using interleaved CCE-to-REG map-ping at an aggregation level of 2.

FIG. 8 illustrates certain exemplary embodiments of the PDCCH candidates for an aggregation level of 2. The CCEs corresponding to different PDCCH candidates may be interleaved. All the CCEs for each PDCCH candidate may be limited to one interleaver block (i.e., one narrowband segment). The distribution of CCEs across frequency may provide improved frequency diversity compared with non-interleaved mapping for aggregation level 2, which may be used for Type2-PDCCH in CORESET #0 (and similarly in CORESET #0-RedCap) for scheduling Msg2 and Msg4 transmissions.

Figure 9:
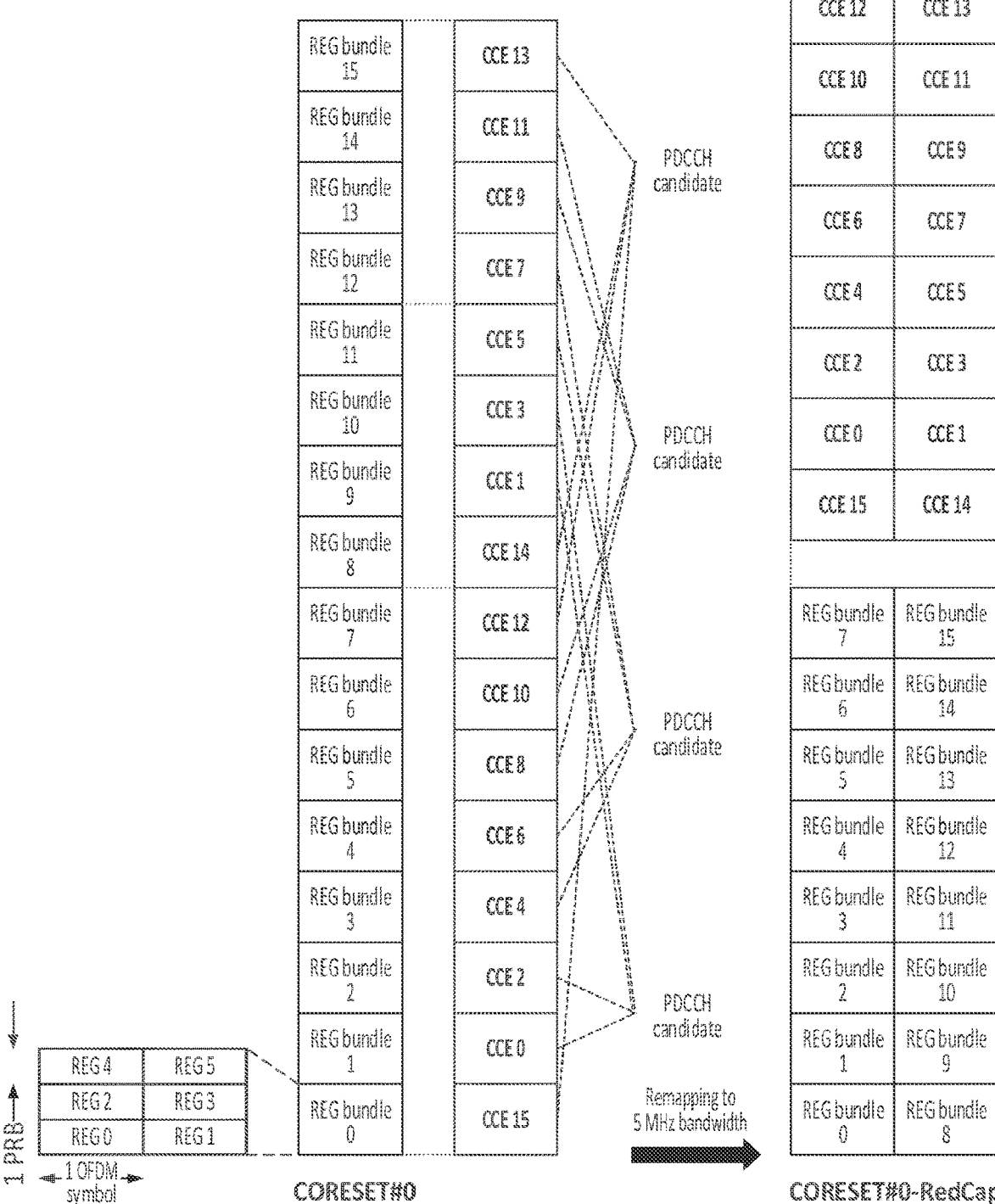
FIG. 9 illustrates an exemplary embodiment of PDCCH candidates remapped using legacy interleaved CCE-to-REG mapping at an aggregation level of 4.

FIG. 9 illustrates certain exemplary embodiments related to PDCCH candidates for an aggregation level of 4 with the legacy interleaved CCE-to-REG mapping across the entire CORESET #0. In this example, the CORESET #0 may be configured with 48 PRBs and 2 OFDM symbols. Compared to the example in FIG. 8, the total number of REGs (and the number of CCEs) is the same, while the number of REGs in one narrowband segment (and the number of CCEs mapped to the REGs) is doubled. That is, there are 8 CCEs in one narrowband segment. FIG. 9 shows the configuration of the CCEs for PDCCH candidates with aggregation level 4 in both the narrowband segments corresponding to CORESET #0.

Figure 10:
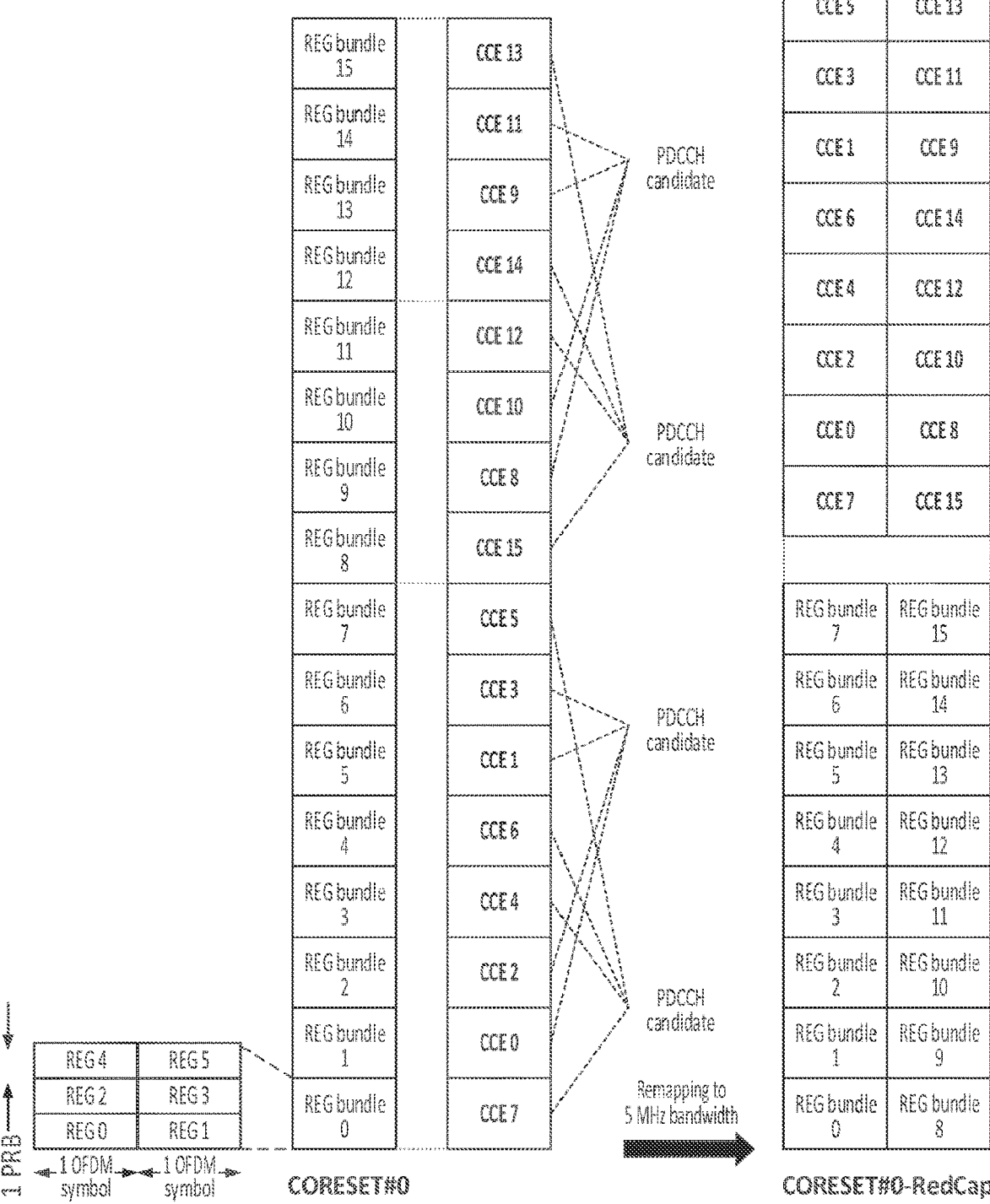
FIG. 10 illustrates another exemplary embodiment of PDCCH candidates remapped using interleaved CCE-to-REG mapping at an aggregation level of 4.

FIG. 10 illustrates the interleaved CCE-to-REG mapping according to certain exemplary embodiments where the interleaving may be performed within interleaver blocks. Each of the interleaver blocks may include a single narrowband segment. FIG. 10 shows that the CCEs for PDCCH candidates for an aggregation level of 4 may occur within a single narrowband segment.

Figure 11:
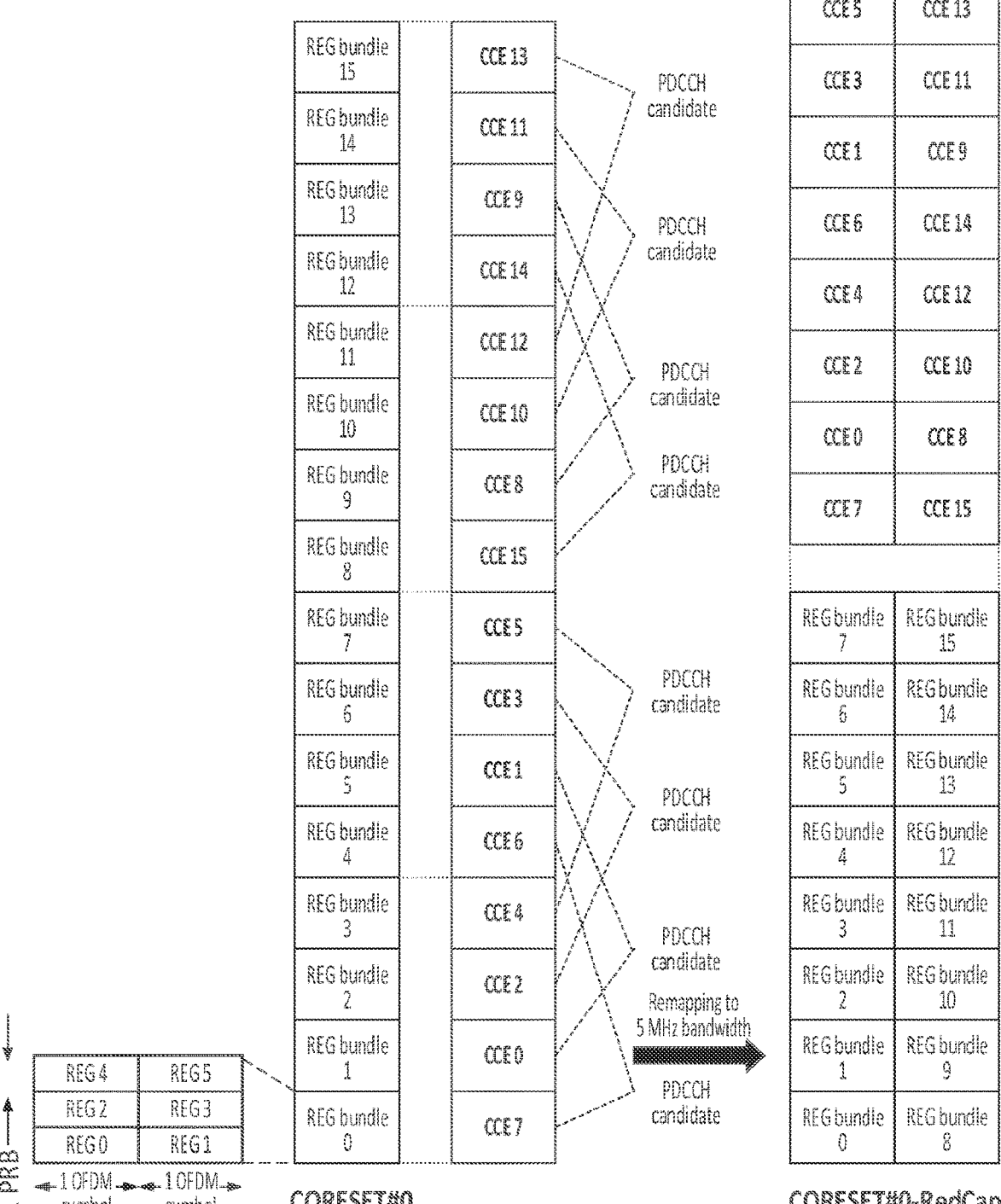
FIG. 11 illustrates another exemplary embodiment of PDCCH candidates remapped using interleaved CCE-to-REG mapping at an aggregation level of 2.

FIG. 11 illustrates certain exemplary embodiments for interleaved CCE-to-REG mapping for PDCCH candidates for an aggregation level of 2. The CCEs for each PDCCH candidate may be distributed across the bandwidth of a narrowband segment, which may provide frequency diversity. The CCEs may be contained within one narrowband segment.

Figure 12:
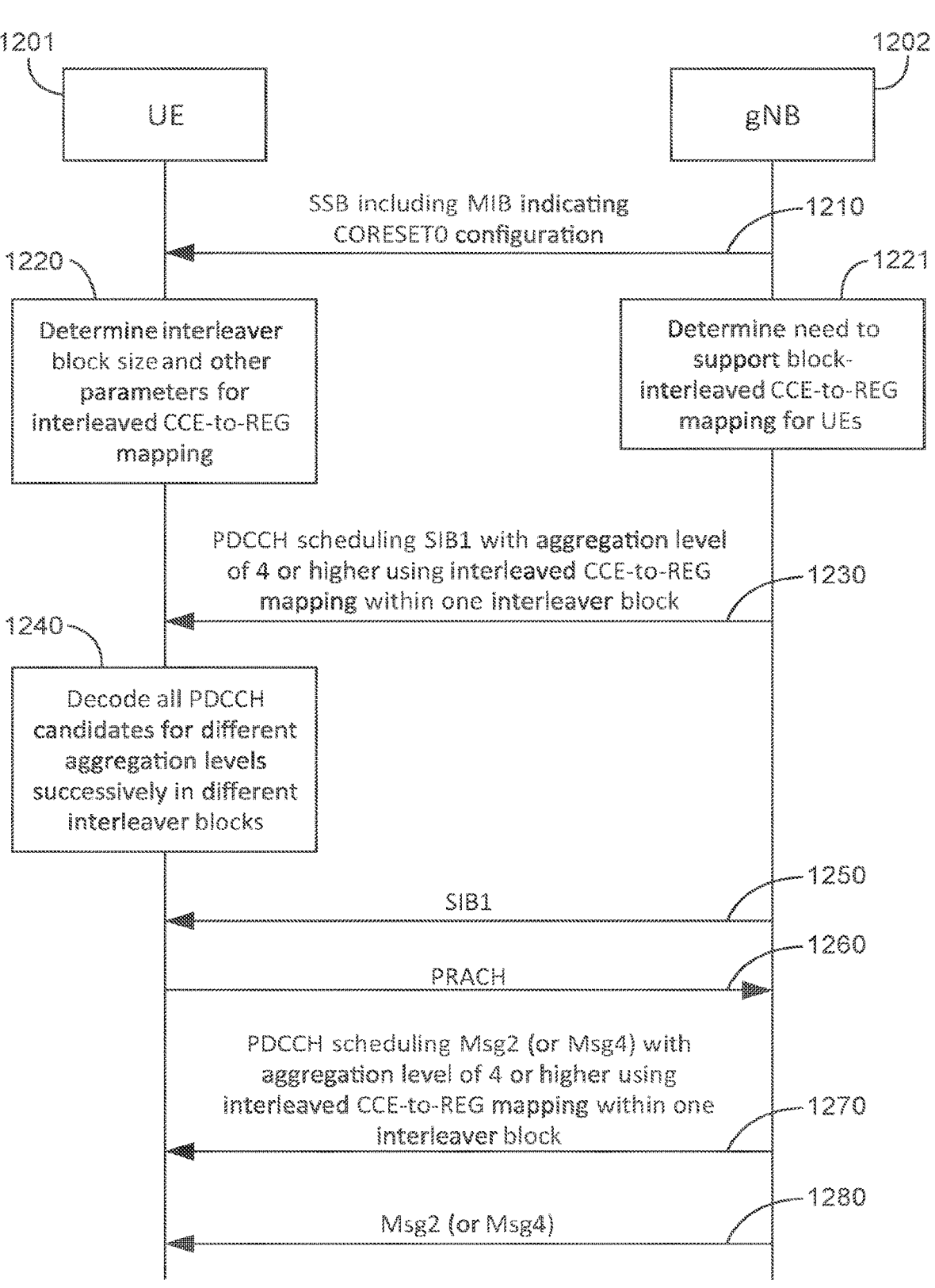
FIG. 12 illustrates a flow diagram for signal processing flow for block-interleaved CCE-to-REG mapping according to various example embodiments.
Figure 15:
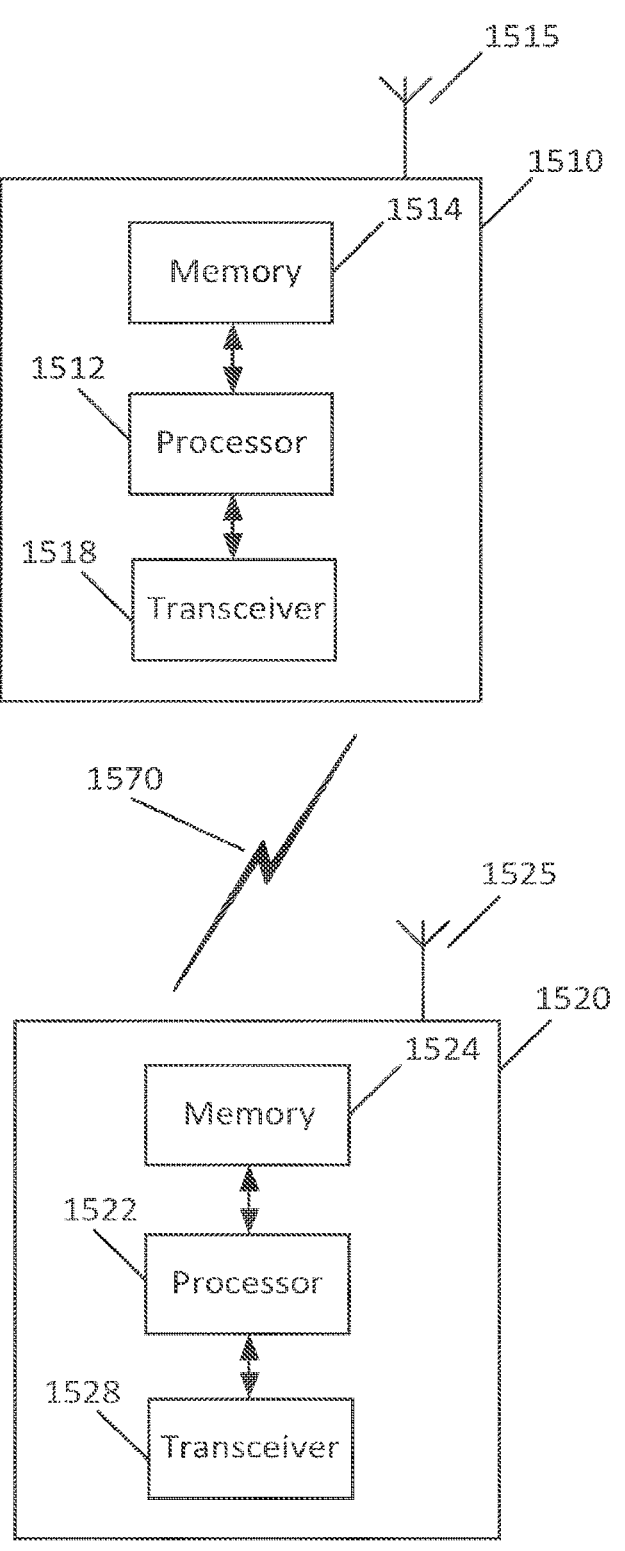
FIG. 15 illustrates a set of apparatuses according to some exemplary embodiments.

FIG. 12 illustrates a signal flow for supporting the block-interleaved CCE-to-REG mapping according to various exemplary embodiments. The UE requiring block interleaving may have a reduced bandwidth and require remapping of the CORESET to narrowband segments, where the interleaved block includes one or more narrowband segments. In some example embodiments, UE 1201 and NE 1202 may be similar to apparatus 1510 and apparatus 1520, respectively, as illustrated in FIG. 15.

At 1210, the NE 1202 may transmit an SSB to the UE 1201, which may include the MIB indicating CORESET #0 configuration. At 1220, the UE 1201 may determine interleaver block size and other parameters for interleaved CCE-to REG mapping. As discussed above with respect to FIG. 6, dividing the CORESET #0-RedCap into narrowband segments may enable REG numbering within each narrowband segment and in increasing order of narrowband segments. Each narrowband segment may have a size of $$N_{RB}^{NB}$$

PRBs in the frequency domain and $$N_{symb}^{CORESET}$$

OFDM symbols in the time domain. The interleaver block may comprise M≥1 narrowband segments, so that the interleaver block size $$N_{RB}^{BLOCK} = MN_{RB}^{NB}.$$

At 1221, the NE 1202 may determine the need to support block-interleaved CCE-to-REG mapping for UEs. At 1230, the NE 1202 may transmit PDCCH scheduling SIB1 with an aggregation level of 4 or higher using interleaved CCE-to-REG mapping within one interleaver block based on the determination. As discussed in detail above with respect to FIGS. 7-11, for PDCCH candidates that have an aggregation level of 4 for mapping of the CCEs to REG bundles, all the CCEs for each PDCCH candidate may be limited to one interleaver block, which may include at least one narrowband segment. The distribution of CCEs across the frequency may provide improved frequency diversity compared with non-interleaved mapping for aggregation level 2, which may be used for Type2-PDCCH in CORESET #0 (and similarly in CORESET #0-RedCap) for scheduling Msg2 and Msg4 transmissions, which occurs at 1270 and 1280 discussed below.

At 1240, the UE 1201 may decode all PDCCH candidates for different aggregation levels successively in different interleaver blocks and successfully decode the PDCCH. At 1250, the NE 1202 may transmit SIB1 to the UE 1201.

At 1260, the UE 1201 may transmit the PRACH to the NE 1202, and at 1270, the NE 1202 may respond by transmitting PDCCH scheduling Msg2 or Msg4 with an aggregation level of 4 or higher using interleaved CCE-to-REG mapping within one interleaver block. At 1280, the NE 1202 may transmit the Msg2 or Msg4.

FIG. 13 illustrates an example flow diagram of a method, according to certain example embodiments. In an example embodiment, the method of FIG. 13 may be performed by a network element, or a group of multiple network elements in a 3GPP system, such as LTE or 5G-NR. For instance, in an example embodiment, the method of FIG. 13 may be performed by a UE similar to apparatus 1510 illustrated in FIG. 15.

According to various exemplary embodiments, the method of FIG. 13 may include, at 1310, receiving, by an apparatus, from an NE similar to apparatus 1520 in FIG. 15, an SSB, which may include an MIB including a first configuration for a first CORESET including a plurality of REGs. At 1320, the method may further include determining an interleaver block size of each of a plurality of interleaver blocks. The plurality of interleaver blocks may be formed by dividing the CORESET in time and numbering the interleaver blocks. Each interleaver block may include at least one of the plurality of narrowband segments that includes a subset of the plurality of REGs. At 1330, the method may further include mapping all of the plurality of resource element groups in each interleaver block of the plurality of interleaver blocks to control channel elements in sequential order, such that all of the plurality of resource element groups of a first interleaver block of the plurality of interleaver blocks may be mapped to the control channel elements before mapping resource element groups of one or more additional interleaver blocks to control channel elements.

According to certain exemplary embodiments, in the method of FIG. 13, the first configuration may be determined based on receiving an SSB, which may comprise an MIB indicating the first configuration.

According to some exemplary embodiments, in the method of FIG. 13, the SSB may include an MIB indicating a second configuration for a second CORESET. The interleaver block size may be based on the second configuration of the second CORESET.

According to certain example embodiments, in the method of FIG. 13, a size of the first control resource set may be equal to a size of the second control resource set.

According to some exemplary embodiments, in the method of FIG. 13, the size of the first control resource set may be based on a first number of physical resource blocks and a first number of orthogonal frequency division multiplexing symbols. The size of the second control resource set may be based on a second number of physical resource blocks and a second number of orthogonal frequency division multiplexing symbols. The first number of physical resource blocks may be based on a bandwidth of the apparatus 1520.

According to some exemplary embodiments, in the method of FIG. 13, each of the plurality of interleaver blocks may comprise a plurality of narrowband segments. A third number of physical resource blocks in each of the plurality of narrowband segments may be based on the bandwidth of the apparatus 1520 and may be equal to the second number of physical resource block, while a third number of orthogonal frequency division multiplexing symbols in each of the plurality of narrowband segments may be the same as the second number of symbols.

According to some exemplary embodiments, in the method of FIG. 13, the plurality of resource element groups may be numbered in increasing order, first in time and then in frequency, within each interleaver block, and the numbering may start with a first symbol and a lowest number of the physical resource blocks in the first interleaver block.

According to some exemplary embodiments, in the method of FIG. 13, a size of the plurality of interleaver blocks is based on at least one of: the bandwidth of the apparatus, 1520 an indication provided in the master information block, a predefined specification, a required quality of service, a specified multiple of a resource element group bundle size parameter and an interleaver size parameter, and a proper factor of a size of the control resource set.

According to some exemplary embodiments, the method of FIG. 13 may further include, based on mapping all of the plurality of resource element groups in all of the plurality of interleaver blocks to the control channel elements, decoding all of a plurality of physical downlink control channel candidates supported by each of the plurality of interleaver blocks.

FIG. 14 illustrates an example of a flow diagram of another method, according to certain example embodiments. In an example embodiment, the method of FIG. 14 may be performed by a network entity, or a group of multiple network elements in a 3GPP system, such as LTE or 5G-NR. For instance, in an example embodiment, the method of FIG. 14 may be performed by NE 1520, a gNB, network, cell, or any other device similar to apparatus 1520 illustrated in FIG. 15.

According to various exemplary embodiments, the method of FIG. 14 may include, at 1410, transmitting, to an apparatus similar to apparatus 1510 in FIG. 15, information indicating a first configuration for a first CORESET including a plurality of REGs. The method may further include, at 1420, determining that all of the plurality of REGs in each interleaver block of a plurality of interleaver blocks to CCEs in sequential order is required. The mapping may be performed such that all of the plurality of REGs of a first interleaver block of the plurality of interleaver blocks may be mapped to the CCEs before mapping REGs of one or more additional interleaver blocks to CCEs. The method may further include, at 1430, upon performance of the mapping, generating and transmitting physical downlink control channel scheduling information based on the mapping of the plurality of interleaver blocks within one narrowband segment.

According to certain exemplary embodiments, in the method of FIG. 14, the first configuration may be based on a synchronization signal block, which may comprise an MIB indicating the first configuration.

According to certain exemplary embodiments, the method of FIG. 14 may further include transmitting an SSB, which may comprise an MIB indicating a second configuration for a second CORESET. The interleaver block size may be determined based on the second configuration of the second CORESET.

According to some exemplary embodiments, in the method of FIG. 14, a size of the first CORESET may be equal to a size of the second CORESET.

According to some exemplary embodiments, in the method of FIG. 14, the size of the first CORESET may be based on a first number of physical resource blocks and a first number of orthogonal frequency division multiplexing symbols. The size of the second CORESET may be based on a second number of physical resource blocks and a second number of orthogonal frequency division multiplexing symbols. The first number of physical resource blocks may be based on a bandwidth of the apparatus.

According to certain exemplary embodiments, in the method of FIG. 14, each of the plurality of interleaver blocks may comprise a plurality of narrowband segments. Further, a third number of physical resource blocks in each of the plurality of narrowband segments may be based on the bandwidth of the apparatus and may be equal to the second number of physical resource block, while a third number of orthogonal frequency division multiplexing symbols in each of the plurality of narrowband segments may be the same as the second number of symbols.

According to some exemplary embodiments, in the method of FIG. 14, the plurality of REGs may be numbered in increasing order, first in time and then in frequency, within each interleaver block, and the numbering may start with a first symbol and a lowest number of the physical resource blocks in the first interleaver block.

According to various exemplary embodiments, in the method of FIG. 14, a size of the plurality of interleaver blocks may be based on at least one of: the bandwidth of the apparatus, an indication provided in the MIB, a predefined specification, a required quality of service, a specified multiple of a REG bundle size parameter and an interleaver size parameter, and a proper factor of a size of the control resource set.

According to certain exemplary embodiments, in the method of FIG. 14, the transmission of the physical downlink control channel scheduling information may cause decoding of all of a plurality of physical downlink control channel candidates supported by each of the plurality of interleaver blocks.

FIG. 15 illustrates a set of apparatus 1510 and 1520 according to various exemplary embodiments. In the various exemplary embodiments, the apparatus 1510 may be an element in a communications network or associated with such a network, such as a UE, mobile equipment (ME), mobile station, mobile device, stationary device, IoT device, or other device. It should be noted that one of ordinary skill in the art would understand that apparatus 1510 may include components or features not shown in FIG. 15. In addition, apparatus 1520 may be a network, core network element, or element in a communications network or associated with such a network, such as a base station, an NE, or a gNB. It should be noted that one of ordinary skill in the art would understand that apparatus 1520 may include components or features not shown in FIG. 15.

In some example embodiments, an apparatus (e.g., apparatus 1510 and/or apparatus 1520) may include means for performing a method, a process, or any of the variants discussed herein. Examples of the means may include one or more processors, memory, controllers, transmitters, receivers, and/or computer program code for causing the performance of the operations.

Various exemplary embodiments described above may provide several technical improvements, enhancements, and/or advantages. For instance, in some exemplary embodiments, it may be possible to apply interleaved CCE-to-REG mapping to any given interleaver block size. For PDCCH transmission in CORESET #0 that is remapped to multiple narrowband segments occurring sequentially in time, interleaved mapping of CCEs may be limited to a single narrowband segment or a few narrowband segments. As a result, the UE may decode PDCCH candidates for aggregation levels that may be supported within one narrowband segment without having to buffer all the narrowband segments comprising the remapped CORESET #0.

Further, any aggregation level that is less than the number of CCEs within one narrowband segment may achieve the benefit of frequency diversity from interleaved CCE-to-REG mapping due to spreading of the CCEs for PDCCH candidates across the bandwidth of the narrowband segment.

In addition, the PDCCH transmitted within an interleaver block may assign OFDM symbols corresponding to subsequent interleaver blocks of the remapped CORESET #0 region to the scheduled PDSCH when no other PDCCH will be transmitted in the interleaver blocks including the assigned OFDM symbols.

In some example embodiments, apparatuses 1510 and/or 1520 may include one or more processors, one or more computer-readable storage medium (for example, memory, storage, or the like), one or more radio access components (for example, a modem, a transceiver, or the like), and/or a user interface. In some example embodiments, apparatuses 1510 and/or 1520 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 15, apparatuses 1510 and/or 1520 may include or be coupled to processors 1512 and 1522, respectively, for processing information and executing instructions or operations. Processors 1512 and 1522 may be any type of general or specific purpose processor. In fact, processors 1512 and 1522 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 1512 (and 1522) for each of apparatuses 1510 and 1520 is shown in FIG. 15, multiple processors may be utilized according to other example embodiments. For example, it should be understood that, in certain example embodiments, apparatuses 1510 and/or 1520 may include two or more processors that may form a multiprocessor system (e.g., in this case processors 1512 and 1522 may represent a multiprocessor) that may support multiprocessing. According to certain example embodiments, the multiprocessor system may be tightly coupled or loosely coupled (e.g., to form a computer cluster).

Processors 1512 and 1522 may perform functions associated with the operation of apparatuses 1510 and/or 1522, respectively, including, as some examples, precoding of antenna gain/phase parameters, encoding and decoding of individual bits forming a communication message, formatting of information, and overall control of the apparatus 1510, including processes illustrated in FIGS. 6-14.

Apparatuses 1510 and/or 1520 may further include or be coupled to memory 1514 and 1524 (internal or external), respectively, which may be coupled to processors 1512 and 1522, respectively, for storing information and instructions that may be executed by processors 1512 and 1522. Memory 1514 (and memory 1524) may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 1514 (and memory 1524) can be comprised of any combination of random access memory (RAM), read only memory (ROM), static storage such as a magnetic or optical disk, hard disk drive (HDD), or any other type of non-transitory machine or computer readable media. The instructions stored in memory 1514 and memory 1524 may include program instructions or computer program code that, when executed by processors 1512 and 1522, enable the apparatuses 1510 and/or 1520 to perform tasks as described herein.

In certain example embodiments, apparatuses 1510 and/or 1520 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 1512 and 1522 and/or apparatuses 1510 and/or 1520 to perform any of the methods illustrated in FIGS. 6-14.

In some exemplary embodiments, apparatuses 1510 and/or 1520 may also include or be coupled to one or more antennas 1515 and 1525, respectively, for receiving a downlink signal and for transmitting via an uplink from apparatuses 1510 and/or 1520. Apparatuses 1510 and/or 1520 may further include transceivers 1518 and 1528, respectively, configured to transmit and receive information. The transceivers 1518 and 1528 may also include a radio interface (e.g., a modem) respectively coupled to the antennas 1515 and 1525. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceivers 1518 and 1528 may be respectively configured to modulate information on to a carrier waveform for transmission by the antenna(s) 1515 and 1525, and demodulate information received via the antenna(s) 1515 and 1525 for further processing by other elements of apparatus 1510. In other example embodiments, transceivers 1518 and 1528 may be capable of transmitting and receiving signals or data directly. Additionally or alternatively, in some example embodiments, apparatuses 1510 and/or 1520 may include an input and/or output device (I/O device). In certain example embodiments, apparatuses 1510 and/or 1520 may further include a user interface, such as a graphical user interface or touchscreen.

In certain example embodiments, memory 1514 and memory 1524 store software modules that provide functionality when executed by processors 1512 and 1522, respectively. The modules may include, for example, an operating system that provides operating system functionality for apparatuses 1510 and/or 1520. The memory may also store one or more functional modules, such as an application or program, to provide additional functionality for apparatus 1510. The components of apparatuses 1510 and/or 1520 may be implemented in hardware, or as any suitable combination of hardware and software. According to certain example embodiments, apparatus 1510 may optionally be configured to communicate with apparatus 1520 via a wireless or wired communications link 1570 according to any radio access technology, such as NR.

According to certain example embodiments, processors 1512/1522 and memory 1514/1524 may be included in or may form a part of processing circuitry or control circuitry. In addition, in some example embodiments, transceivers 1518 and 1528 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 1510 and 1520) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 1510 or apparatus 1520), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
5GS 5G System
BWP Bandwidth Part
CE Control Element
CCE Control Channel Element
CORESET Control Resource Set
DCI Downlink Control Information
DL Downlink
DRB Data Radio Bearer
E-UTRAN Evolved UTRAN
EMBB Enhanced Mobile Broadband
FD-FDD Full Duplex Frequency Division Duplex
FR1 Frequency Range 1
FR2 Frequency Range 2
gNB 5G or Next Generation NodeB
LTE Long Term Evolution
MIB Master Information Block
Msg2 Random Access Response Message
Msg4 Contention Response
NR New Radio
OFDM Orthogonal Frequency Division Multiplexing
PBCH Physical Broadcast Channel
PDCCH Physical Downlink Control Channel
PDU Protocol Data Unit
PRB Physical Resource Block
QoS Quality of Service
RE Resource Element
RedCap Reduced capability NR
REG Resource Element Group
RMSI Remaining Minimum System Information
SDU Service Data Unit
SIB System Information Block
SCS Subcarrier Spacing
SSB Synchronization Signal Block
TB Transport Block
UE User Equipment
UL Uplink
URLLC Ultra Reliable Low Latency Communication

We claim:

1. A method, comprising:
   determining, by an apparatus, a first set of parameters comprising a first configuration for a first control resource set including a plurality of resource element groups;
   determining an interleaver block size of each of a plurality of interleaver blocks, the plurality of interleaver blocks being formed by dividing the first control resource set in time and numbering the interleaver blocks, wherein the interleaver block size of each of the plurality of interleaver blocks is based on at least one of:
   the bandwidth of the apparatus;
   a required quality of service; and
   a proper factor of a product of the first number of physical resource blocks and the first number of orthogonal frequency division multiplexing symbols; and
   mapping the plurality of resource element groups to control channel elements, such that resource element groups of a first interleaver block of the plurality of interleaver blocks, which are a subset of the plurality of resource element groups, are mapped to the control channel elements before mapping resource element groups of any subsequent interleaver block of the plurality of interleaver blocks to control channel elements, wherein the plurality of resource element groups are numbered in increasing order, first in time and then in frequency, within each interleaver block, and the numbering starts with a first symbol and a physical resource block with a lowest index within the first interleaver block.

2. The method according to claim 1, wherein the determining of the first configuration is based on receiving, by the apparatus, a synchronization signal block, which comprises a master information block indicating the first configuration.

3. The method according to claim 1, further comprising receiving, by the apparatus, a synchronization signal block, which comprises a master information block indicating a second configuration for a second control resource set,
   wherein the determining of the interleaver block size is based on the second configuration of the second control resource set.

4. The method according to claim 3, wherein a size of the first control resource set is equal to a size of the second control resource set.

5. The method according to claim 3, wherein:
   the size of the first control resource set is based on a first number of physical resource blocks and a first number of orthogonal frequency division multiplexing symbols of the first configuration;
   the size of the second control resource set is based on a second number of physical resource blocks and a second number of orthogonal frequency division multiplexing symbols of the second configuration; and
   the first number of physical resource blocks is based on a bandwidth of the apparatus.

6. The method according to claim 1, wherein the interleaver block size of each of the plurality of interleaver blocks is further based on at least one of:
   the bandwidth of the apparatus;
   a required quality of service;
   and
   a proper factor of a product of the first number of physical resource blocks and the first number of orthogonal frequency division multiplexing symbols.

7. The method according to claim 1, further comprising, based on mapping the plurality of resource element groups in all of the plurality of interleaver blocks to the control channel elements, decoding at least one of a plurality of physical downlink control channel candidates supported by control channel elements mapped to the plurality of resource element groups of the plurality of interleaver blocks.

8. An apparatus, comprising:

at least one processor; and at least one computer readable storage medium storing instructions that, when executed by the at least one processor, cause the apparatus at least to:

determine a first set of parameters comprising a first configuration for a first control resource set including a plurality of resource element groups;

determine an interleaver block size of each of a plurality of interleaver blocks, the plurality of interleaver blocks being formed by dividing the first control resource set in time and numbering the interleaver blocks, wherein an interleaver block size of each of the plurality of interleaver blocks is based on at least one of:

the bandwidth of the apparatus;

a required quality of service; and a proper factor of a product of the first number of physical resource blocks and the first number of orthogonal frequency division multiplexing symbols; and map the plurality of resource element groups to control channel elements, such that resource element groups of a first interleaver block of the plurality of interleaver blocks, which are a subset of the plurality of resource element groups, are mapped to the control channel elements before mapping resource element groups of any subsequent interleaver block of the plurality of interleaver blocks to control channel elements, wherein the plurality of resource element groups are numbered in increasing order, first in time and then in frequency, within each interleaver block, and the numbering starts with a first symbol and a physical resource block with a lowest index within the first interleaver block.

9. The apparatus according to claim 8, wherein the first configuration is determined based on a synchronization signal block received by the apparatus, which comprises a master information block indicating the first configuration.

10. The apparatus according to claim 8, wherein the stored instructions, when executed by the at least one processor, further cause the apparatus at least to receive a synchronization signal block, which comprises a master information block indicating a second configuration for a second control resource set, wherein the determining of the interleaver block size is based on the second configuration of the second control resource set.

11. The apparatus according to claim 8, wherein the interleaver block size of each of the plurality of interleaver blocks is further based on at least one of:

the bandwidth of the apparatus;

a required quality of service; and a proper factor of a product of the first number of physical resource blocks and the first number of orthogonal frequency division multiplexing symbols.

12. The apparatus according to claim 8, wherein the stored instructions, when executed by the at least one processor, further cause the apparatus at least to, based on mapping the plurality of resource element groups in all of the plurality of interleaver blocks to the control channel elements, decode at least one of a plurality of physical downlink control channel candidates supported by control channel elements mapped to the plurality of resource element groups of the plurality of interleaver blocks.

13. An apparatus, comprising:

at least one processor; and at least one computer readable storage medium storing instructions that, when executed by the at least one processor, cause the apparatus at least to:

transmit information indicating a first configuration for a first control resource set including a plurality of resource element groups;

determine the plurality of resource element groups are to be mapped to control channel elements, resource element groups of a first interleaver block of a plurality of interleaver blocks, which are a subset of the plurality of resource element groups, being mapped to the control channel elements before mapping resource element groups of any subsequent interleaver block of the plurality of interleaver blocks to control channel elements, wherein an interleaver block size of each of the plurality of interleaver blocks is based on at least one of:

the bandwidth of the apparatus;

a required quality of service; and a proper factor of a product of the first number of physical resource blocks and the first number of orthogonal frequency division multiplexing symbols; and upon the plurality of resource element groups being mapped to the control channel elements, transmit a physical downlink control channel to the apparatus in control channel elements mapped to resource element groups of one or more interleaver blocks of the plurality of interleaver blocks, wherein the plurality of resource element groups are numbered in increasing order, first in time and then in frequency, within each interleaver block, and the numbering starts with a first symbol and a physical resource block with a lowest index within the first interleaver block.

14. The apparatus according to claim 13, wherein the first configuration is based on a synchronization signal block, which comprises a master information block indicating the first configuration.

15. The apparatus according to claim 13, wherein the stored instructions, when executed by the at least one processor, further cause the apparatus at least to transmit a synchronization signal block, which comprises a master information block indicating a second configuration for a second control resource set, wherein the interleaver block size is determined based on the second configuration of the second control resource set.

16. The apparatus according to claim 13, wherein the interleaver block size of each of the plurality of interleaver blocks is further based on at least one of:

the bandwidth of the apparatus;

a required quality of service; and a proper factor of a product of the first number of physical resource blocks and the first number of orthogonal frequency division multiplexing symbols.

17. The apparatus according to claim 13, wherein the transmitting of the physical downlink control channel scheduling information causes decoding at least one of a plurality of physical downlink control channel candidates supported by control channel elements mapped to the plurality of resource element groups of the plurality of interleaver blocks.

* * * * *